United States Patent
Rao et al.

(10) Patent No.: US 12,415,135 B2
(45) Date of Patent: Sep. 16, 2025

(54) EFFECTIVE MULTI-SCALE MULTI-GRANULAR TARGETING FOR GAME USERS

(71) Applicant: Samsung Electronics Co., Ltd., Suwon-si (KR)

(72) Inventors: Anirudh Rao, San Jose, CA (US); Tomasz J. Palczewski, Danville, CA (US); Yingnan Zhu, Irvine, CA (US); Hong-Hoe Kim, Aliso Viejo, CA (US); Xiangyuan Zhao, Irvine, CA (US); Hari Babu Nayar, Hayward, CA (US); Chaitanya Praveen Pratury, Mountain House, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 292 days.

(21) Appl. No.: 18/059,835

(22) Filed: Nov. 29, 2022

(65) Prior Publication Data

US 2024/0139629 A1 May 2, 2024

Related U.S. Application Data

(60) Provisional application No. 63/421,084, filed on Oct. 31, 2022.

(51) Int. Cl.
*A63F 13/61* (2014.01)
*A63F 13/79* (2014.01)
*G06Q 30/0251* (2023.01)

(52) U.S. Cl.
CPC .............. *A63F 13/61* (2014.09); *A63F 13/79* (2014.09); *G06Q 30/0251* (2013.01); *A63F 2300/5506* (2013.01); *A63F 2300/5546* (2013.01)

(58) Field of Classification Search
CPC .. A63F 13/61; A63F 13/79; A63F 2300/5506; A63F 2300/5546; A63F 13/67; G06Q 30/0251
(Continued)

(56) References Cited

U.S. PATENT DOCUMENTS 8,751,310 B2 * 6/2014 van Datta .......... G06Q 30/0246
  705/14.58
8,905,838 B2 12/2014 Kurabayashi et al.
(Continued)

FOREIGN PATENT DOCUMENTS

JP 2014004331 A 1/2014
WO 2009113054 A1 9/2009

OTHER PUBLICATIONS

Wu et al., "Session-based Recommendation with Graph Neural Networks", Association for the Advancement of Artificial Intelligence, Jan. 2019, 9 pages.
(Continued)

*Primary Examiner* — Pierre E Elisca

(57) ABSTRACT

A method includes obtaining, based on a sequential graph-based model, gaming exposure information over time, where the gaming exposure information includes device-level preferences and household-level preferences. The method also includes combining one or more raw user behavior sessions into a gameplay session based on the obtained gaming exposure information. The method further includes providing a scoring metric to (i) check an extent of multi-matching in the obtained gaming exposure information and (ii) remove untrustworthy gaming exposures from the obtained gaming exposure information. In addition, the method includes generating, based on a feature engineering pipeline, one or more game segments running in a production environment, where the one or more game segments are iden-
(Continued)

tified for ancillary content based on inferences by a machine learning model trained using the gaming exposure information.

25 Claims, 17 Drawing Sheets

(58) Field of Classification Search
    USPC .......................................................... 463/31
    See application file for complete search history.

(56) References Cited

U.S. PATENT DOCUMENTS

| | | | |
|---|---|---|---|
| 9,981,189 | B1 | 5/2018 | Wakeford et al. |
| 10,046,239 | B2* | 8/2018 | Van Datta .......... G06Q 30/0246 |
| 11,185,781 | B2 | 11/2021 | Tortosa et al. |
| 11,331,581 | B2 | 5/2022 | Pedersen et al. |
| 2007/0043616 | A1* | 2/2007 | Kutaragi ............... H04N 21/435 |
| | | | 705/14.68 |
| 2007/0072676 | A1 | 3/2007 | Baluja |
| 2007/0078706 | A1* | 4/2007 | Datta ................. G06Q 30/0272 |
| | | | 705/14.66 |
| 2007/0079331 | A1* | 4/2007 | Datta ............... H04N 21/25841 |
| | | | 725/23 |
| 2013/0232000 | A1* | 9/2013 | van Datta .......... G06Q 30/0261 |
| | | | 705/14.45 |
| 2013/0232001 | A1* | 9/2013 | van Datta ............... A63F 13/79 |
| | | | 705/14.45 |
| 2014/0279047 | A1 | 9/2014 | Wang et al. |
| 2015/0099589 | A1 | 4/2015 | Smith |
| 2019/0373331 | A1 | 12/2019 | Benzatti et al. |
| 2020/0078685 | A1* | 3/2020 | Aghdaie ................. A63F 13/79 |
| 2020/0384367 | A1* | 12/2020 | Lake-Schaal ............ G06N 5/04 |
| 2021/0011958 | A1* | 1/2021 | Cox .................... G06F 16/9035 |
| 2022/0088481 | A1 | 3/2022 | Dicken et al. |
| 2022/0088483 | A1 | 3/2022 | Dicken et al. |
| 2022/0088484 | A1 | 3/2022 | Dicken et al. |

OTHER PUBLICATIONS

Chen et al., "Behavior Sequence Transformer for E-commerce Recommendation in Alibaba", arXiv:1905.06874v1, May 2019, 4 pages.
International Search Report and Written Opinion of the International Searching Authority dated Oct. 10, 2023 in connection with International Patent Application No. PCT/KR2023/009532, 9 pages.
Supplementary European Search Report dated May 21, 2025 in connection with European Patent Application No. 23885939.1, 10 pages.
Chen et al., "Sequential Recommendation in Online Games with Multiple Sequences, Tasks and User Levels," arXiv:2102.06950v2 [cs.AI], Jun. 2021, 11 pages.

* cited by examiner

FIG. 3

| Start time 301a | End time 301b | Content type 301c | | |
|---|---|---|---|---|
| Game title 302a | Game genre 302b | Game rating 302c | Game publisher 302d | Game series 302e |
| Screen size 303a | Screen resolution 303b | Panel type 303c | Model year 303d | |
| App ID 304a | Start time 304b | End time 304c | App category 304d | |
| Start time 305a | End time 305b | Game mode? 305c | Gaming hub? 305d | Refresh rate 305e |
| Age 306a | Gender 306b | Location 306c | | |
| Start time 307a | End time 307b | App name 307c | App category 307d | Game played 307e |
| Start time 308a | End time 308b | Streaming video 308c | | |
| Start time 309a | End time 309b | Device connected 309c | HDMI port 309d | Gaming console? 309e |

300
- ACR (GAME, VoD, Prog, AD) 301
- Game metadata 302
- Hardware 303
- App usage 304
- KPI 305
- ...
- Demographics 306
- Mobile usage data 307
- Video streaming data 308
- HDMI data 309

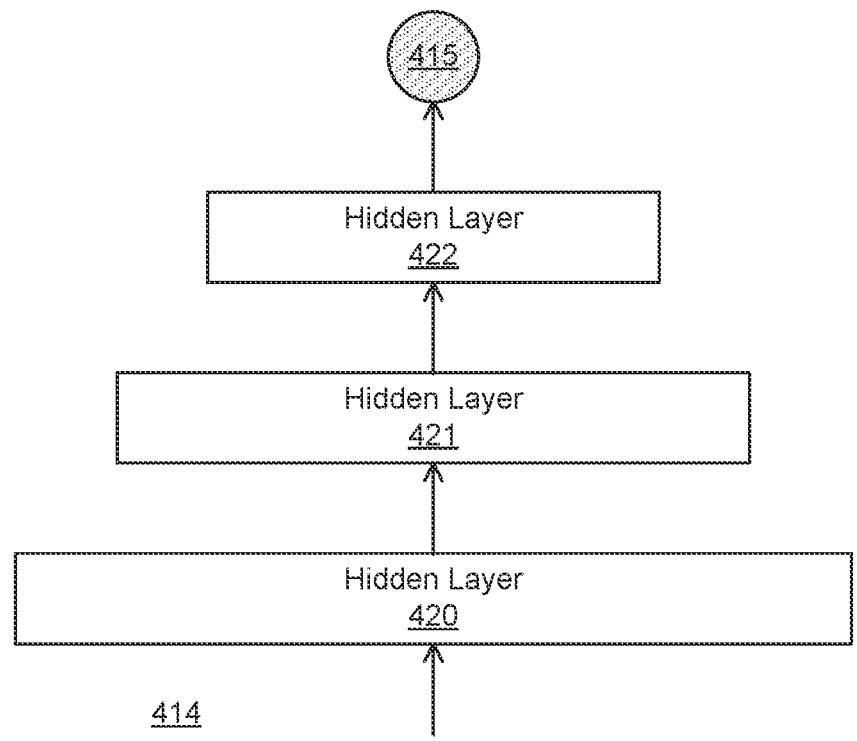
FIG. 4A
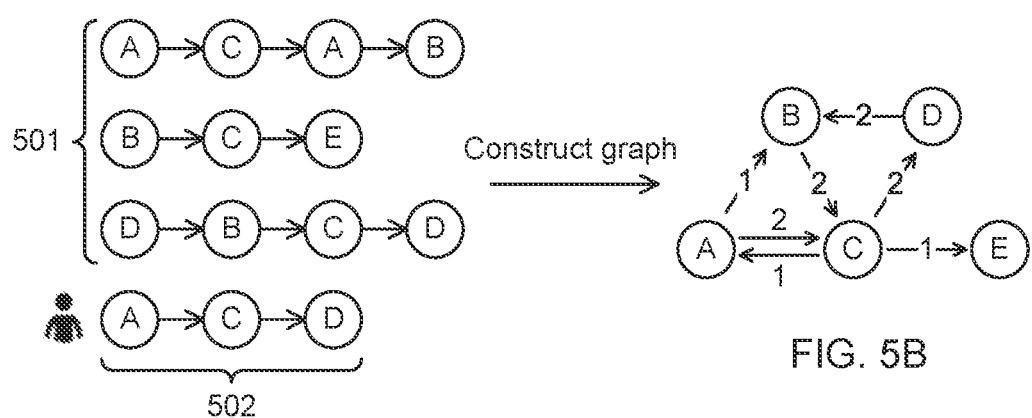
FIG. 5A
FIG. 5B

FIG. 7

Exposure 1 genre vector: | 1 | 1 | 0 |
Exposure 2 genre vector: | 0 | 1 | 1 |
Final genre vector: | 0.5 | 1 | 0.5 |

Exposure 1 genre rating: | 0 | 0 | 1 |
Exposure 2 genre rating: | 0 | 1 | 0 |
Final genre rating: | 0 | 0.5 | 0.5 |

FIG. 8

| Monday | Tuesday | Wednesday | Thursday | Friday | Saturday | Sunday |
|---|---|---|---|---|---|---|
| 0.2 | 0 | 0 | 0 | 0.5 | 0.3 | 0 |

↑ 2/(2+5+3)    ↑ 5/(2+5+3)    ↑ 3/(2+5+3)

EFFECTIVE MULTI-SCALE MULTI-GRANULAR TARGETING FOR GAME USERS

CROSS-REFERENCE TO RELATED APPLICATION AND PRIORITY CLAIM

This application claims priority under 35 U.S.C. § 119(e) to U.S. Provisional Patent Application No. 63/421,084 filed on Oct. 31, 2022. This provisional application is hereby incorporated by reference in its entirety.

TECHNICAL FIELD

This disclosure relates generally to machine learning systems. More specifically, this disclosure relates to effective multi-scale multi-granular targeting for game users.

BACKGROUND

Simple rule-based advertisement or recommender systems have limitations for users that have very specific preferences regarding interactions with devices and/or content. For example, some users may have specific time-of-day preferences for specific activities (such as gaming), device preferences for those activities, and/or ancillary device use for either a primary device or a specific activity.

SUMMARY

This disclosure relates to effective multi-scale multi-granular targeting for game users.

In a first embodiment, a method includes obtaining, based on a sequential graph-based model, gaming exposure information over time, where the gaming exposure information includes device-level preferences and household-level preferences. The method also includes combining one or more raw user behavior sessions into a gameplay session based on the obtained gaming exposure information. The method further includes providing a scoring metric to (i) check an extent of multi-matching in the obtained gaming exposure information and (ii) remove untrustworthy gaming exposures from the obtained gaming exposure information. In addition, the method includes generating, based on a feature engineering pipeline, one or more game segments running in a production environment, where the one or more game segments are identified for ancillary content based on inferences by a machine learning model trained using the gaming exposure information.

In a second embodiment, an apparatus includes at least one processing device configured to obtain, based on a sequential graph-based model, gaming exposure information over time, where the gaming exposure information includes device-level preferences and household-level preferences. The at least one processing device is also configured to combine one or more raw user behavior sessions into a gameplay session based on the obtained gaming exposure information. The at least one processing device is further configured to provide a scoring metric to (i) check an extent of multi-matching in the obtained gaming exposure information and (ii) remove untrustworthy gaming exposures from the obtained gaming exposure information. In addition, the at least one processing device is configured to generate, based on a feature engineering pipeline, one or more game segments running in a production environment, where the one or more game segments are identified for ancillary content based on inferences by a machine learning model trained using the gaming exposure information.

In a third embodiment, a non-transitory computer readable medium contains instructions that when executed cause at least one processor to obtain, based on a sequential graph-based model, gaming exposure information over time, where the gaming exposure information includes device-level preferences and household-level preferences. The non-transitory computer readable medium also contains instructions that when executed cause the at least one processor to combine one or more raw user behavior sessions into a gameplay session based on the obtained gaming exposure information. The non-transitory computer readable medium further contains instructions that when executed cause the at least one processor to provide a scoring metric to (i) check an extent of multi-matching in the obtained gaming exposure information and (ii) remove untrustworthy gaming exposures from the obtained gaming exposure information. In addition, the non-transitory computer readable medium contains instructions that when executed cause the at least one processor to generate, based on a feature engineering pipeline, one or more game segments running in a production environment, where the one or more game segments are identified for ancillary content based on inferences by a machine learning model trained using the gaming exposure information.

In a fourth embodiment, a method includes generating, using a machine learning model trained using a feature engineering pipeline including device-level features and household-level features, device-level and household-level advertising targeting inferences for one or more game segments running in a production environment. The method also includes determining, from the device-level and household-level advertising targeting inferences, genre advertising targeting inferences relating to the one or more game segments.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts:

FIG. 3 illustrates example data sources that may be used for the process flow of FIGS. 2A through 2C in accordance with this disclosure;

FIGS. 4 and 4A illustrate an example system supporting a sequence-based approach for device-level targeting as part of multi-scale multi-granular targeting for game users and related details in accordance with this disclosure;

FIGS. 5A and 5B illustrate an example of creating a subgraph for each session using a graph neural network (GNN) layer within FIG. 4 in accordance with this disclosure;

FIGS. 7 and 8 illustrate examples of how feature aggregation may work for categorical features in the process flow of FIG. 2 in accordance with this disclosure;

DETAILED DESCRIPTION

Figure 1:
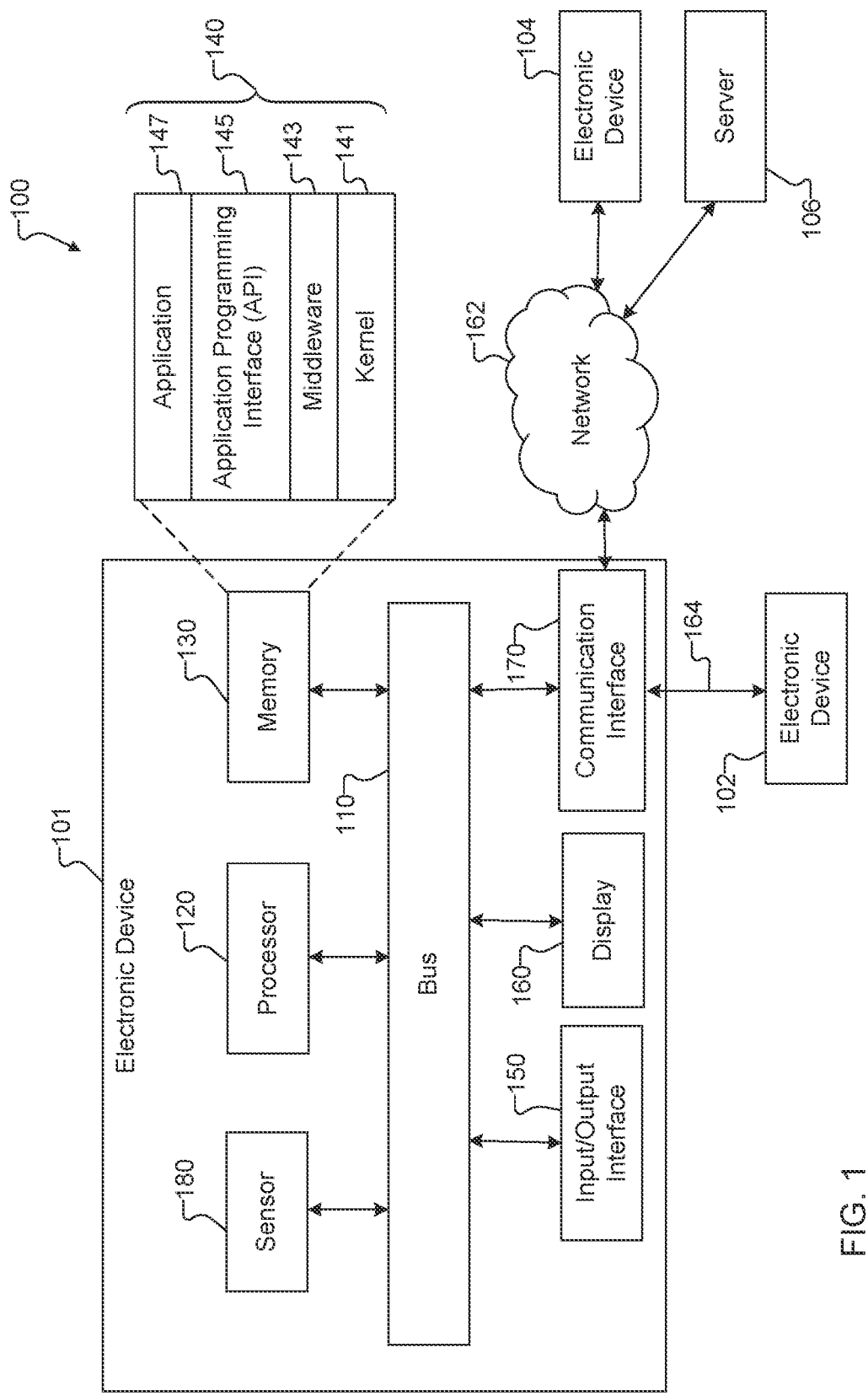
FIG. 1 illustrates an example network configuration including an electronic device in accordance with this disclosure.

FIGS. 1 through 16, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, simple rule-based advertisement or recommender systems have limitations for users that have very specific preferences regarding interactions with devices and/or content. For example, some users may have specific time-of-day preferences for specific activities (such as gaming), device preferences for those activities, and/or ancillary device use for either a primary device or a specific activity.

The global video game market size was valued at US $195.65 billion in 2021 and is expected to expand at a compound annual growth rate (CAGR) of 12.9% from 2022 to 2030. Television and mobile phone manufacturers embed content recognition technology within such devices, presenting a unique opportunity to gather rich user behavior data that highlights the likes and dislikes of individual users. These data points around user behavior open the door to leverage the power of deep learning and artificial intelligence (AI) to build models that can learn the underlying complexities of user interactions by simultaneously considering multiple inputs. As an example, if a user prefers playing a game at night with the "game mode" feature on the television enabled while connecting to a gaming headset, these are three very unique user preferences that may be desirable to capture. This holds true especially in the gaming domain, since each user has his or her own unique way of interacting with a game title and since there is no predetermined start or end time when someone plays a game or the duration for which a user plays a game. Hence, applying AI-based solutions for advertisement targeting has substantial upside over simple rule-based approaches.

Observing the game play behavior of a user can also be beneficial in other domains. For example, suppose a game player has a gaming console. The user may be receptive to marketing that is related to a gaming headset if the user spends a considerable amount of time playing games on a smart television. If the user plays a lot of games from a certain publisher, other games from the same publisher that align with the user's tastes can be recommended. Additionally, a recommender system could be built that can dynamically learn user preferences over time and recommend game ads/game titles the user should consider exploring.

Current systems for game title recognition on smart televisions may utilize predetermined video fingerprints, where clips utilized to create the fingerprints are displayed only at certain points during the gameplay session, are sourced from a third-party vendor, and are limited to a few clips per title. There are multiple issues when data is collected in this way. For example, since game sessions are not static and can have varying lengths, a user may or may not reach a stage in the game where these clips are played, and sessionizing game play sessions in an accurate manner is a major challenge. Also, in some scenarios, a game title content is recognized as another content type (such as a TV program or linear ad), so the accuracy of the exposures logged as game exposures are questionable for these instances. Further, the clips used might be too specific, such as if a third-party vendor delivers a fingerprinting clip with very unique actions, in which case the detection algorithm would not work for the majority of users. In addition, the length of the clips may often be too short (such as when the length of a clip is around 45 seconds on average), which can be too short in comparison to the length of a game session (which may be many hours in length). Finally, there is no accurate way to determine the start or the end point of a game session, such as when a user starts or exits a game, in which case automatic content recognition (ACR) data does not flag these as end of session exposures.

In this disclosure, various solutions to the above problems are provided. For example, this disclosure provides a flexible architecture in which gaming segments can be created at different granularities, such as individual device-level and household-level granularities. A machine learning model may be used to capture temporal information of gamers and historical preferences of the gamers, including hardware attributes and information regarding game devices. In some cases, the machine learning model may include one or more artificial neural networks (ANNs), one or more transformers, and/or one or more graph neural networks (GNNs). Features from multiple data sources can be leveraged to capture user behavior accurately. A custom scoring metric (called an "overlap score") can be provided to check the extent of multi-matching observed in collected gaming exposure data and can be used as a filter to remove exposures that are not trustworthy. Real game play sessions can be approximated, such as by stitching together exposures within a certain time window. Additionally, the machine learning pipeline can improve upon existing frameworks and enhance the game segment creation process for advertising targeting.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described below, the processor 120 may be used to provide multi-scale multi-granular targeting for game users.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications for multi-scale multi-granular targeting for game users. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. For example, one or more sensors 180 may include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th Generation (5G) wireless system, millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may be used to provide multi-scale multi-granular targeting for game users.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2A:
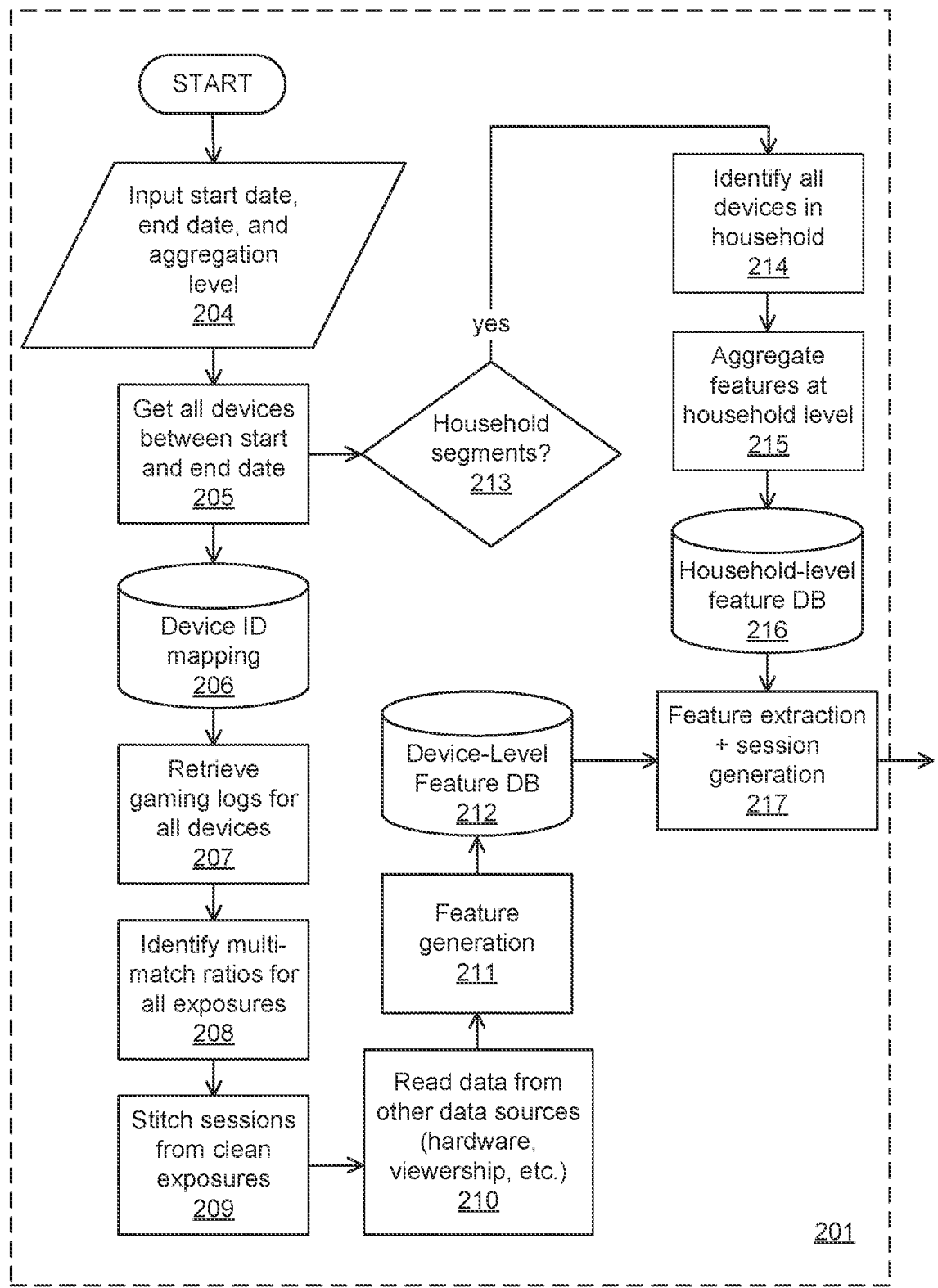
FIGS. 2A through 2C illustrate an example process flow for multi-scale multi-granular targeting for game users in accordance with this disclosure.
Figure 2B:
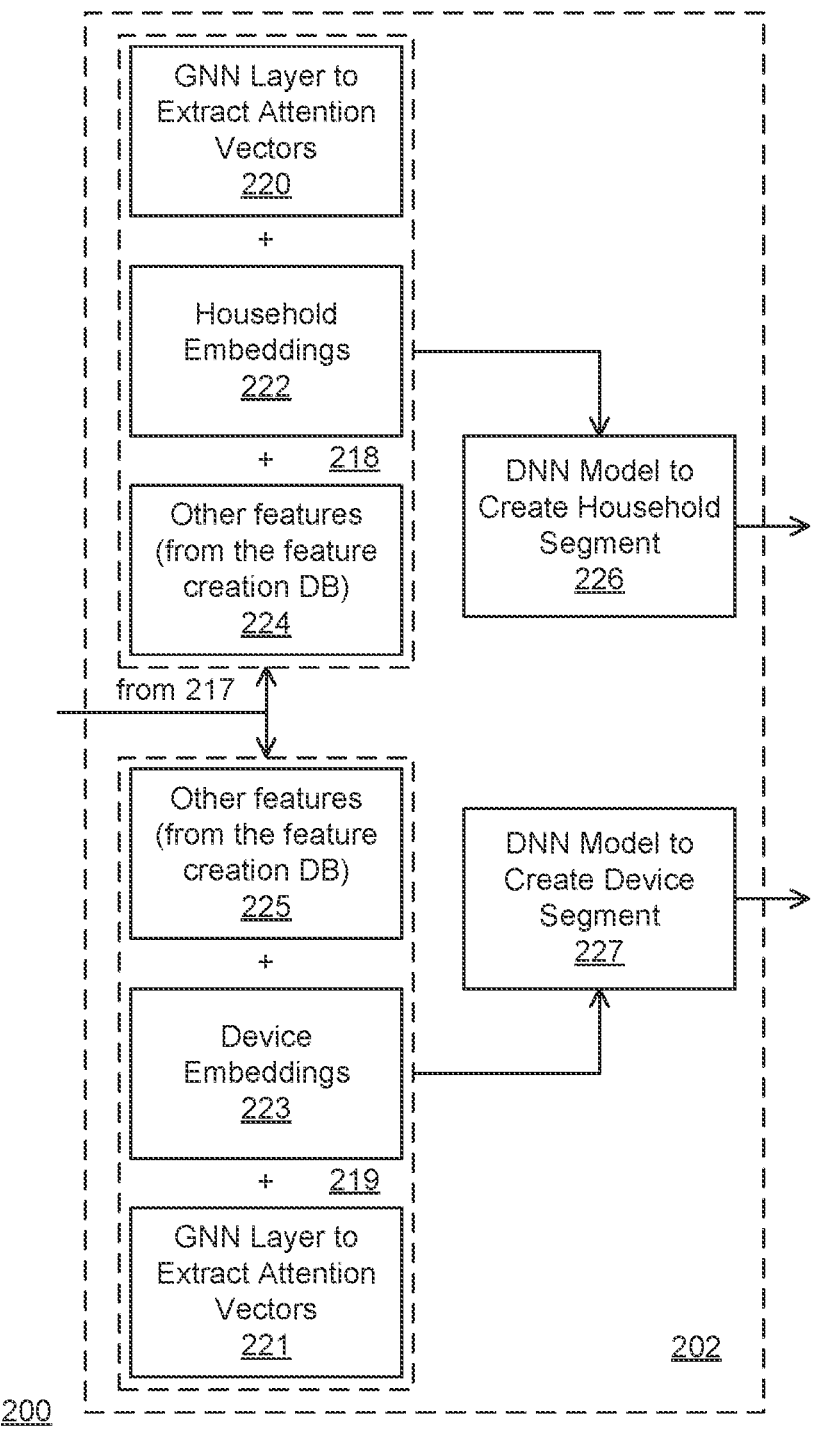
Figure 2C:
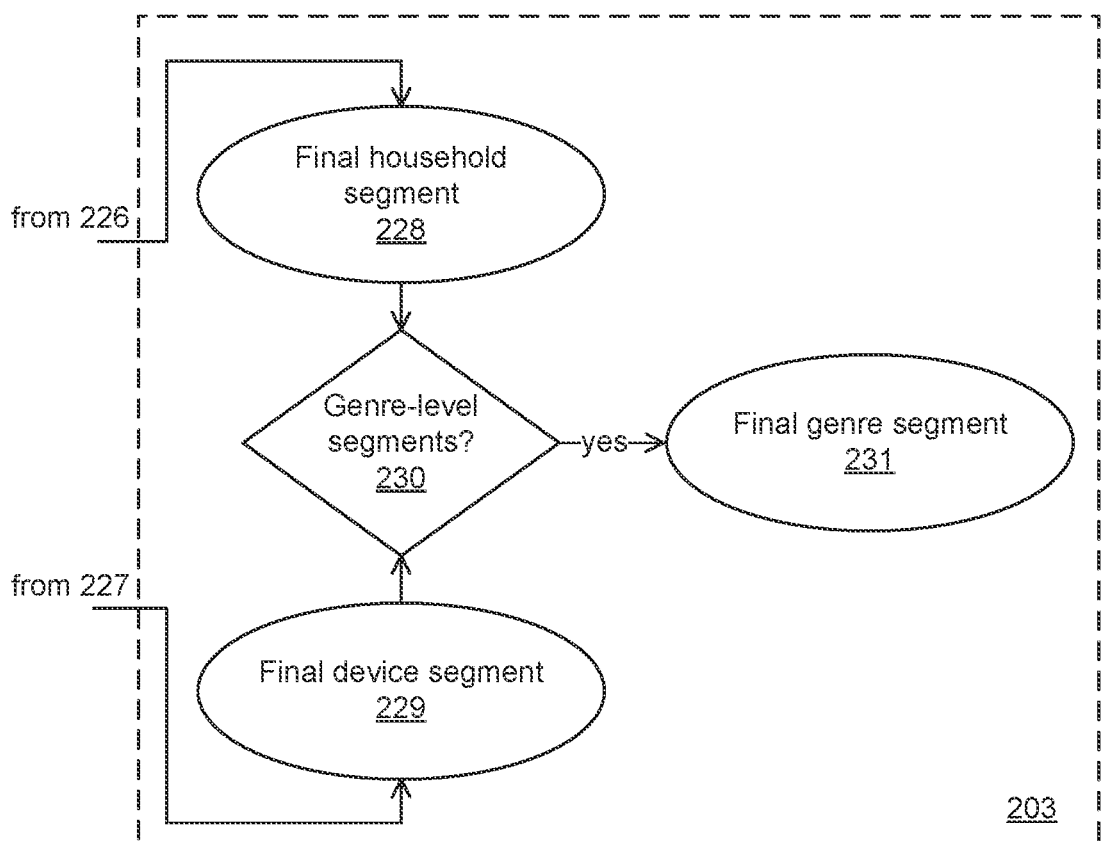

FIGS. 2A through 2C illustrate an example process flow 200 for multi-scale multi-granular targeting for game users in accordance with this disclosure. For ease of explanation, the process flow 200 shown in FIGS. 2A through 2C is described as being implemented on or supported by one or more components in the network configuration 100 of FIG. 1, such as the electronic device 101, the server 106, or both. However, the process flow 200 shown in FIGS. 2A through 2C could be used with any other suitable device(s) and in any other suitable system(s).

The process flow 200 generally includes feature engineering 201 as shown in FIG. 2A, processing with machine learning components 202 as shown in FIG. 2B, and processing by an application 203 as shown in FIG. 2C. In general, the feature engineering 201 illustrated in FIG. 2A operates on collected and reported automatic content recognition (ACR) data. Within feature engineering 201, a start date, an end date, and an aggregation level are received as input data 204 for feature generation. The input data 204 is used to select the dataset upon which feature generation will be performed. Other inputs could also be employed in addition to start date, end date, and aggregation level. For example, for specific purposes, geographic locations of users or user ages might be specified.

Within the dataset corresponding to the input data 204, all devices used between the start date and the end date for gaming may be identified (block 205), and a device identifier (ID) mapping database 206 may be populated. The devices may be identified, for example, from collected and reported ACR data within the dataset corresponding to the input data 204. Gaming logs for each device may be retrieved (block 207), and multi-match ratios for gaming exposures on a respective device may be determined (block 208). The multi-match ratios are used to filter for only "clean" gaming exposures, and sessions may be stitched together from those clean exposures (block 209). Example approaches for determining multi-match ratios for clean gaming exposures are described in further detail below in connection with FIGS. 10 and 11.

In some cases, stitching together sessions to approximate real game play sessions from content recognition logs may proceed as follows. Consider a user U and a game_title_id T. The content recognition database may include fingerprints for all clips associated with title T. All instances of the user playing the game title can be logged in the system, where each exposure has an associated start_time ($S_i$) and an associated end_time ($E_i$). Suppose the given (U, T) has seven instances, where the start times and end times are collected in a list (start_end_list) for this (U, T) combination and are represented as follows.

start_end_list [(U, T)]=[[$S_1$, $E_1$], [$S_2$, $E_2$], [$S_3$, $E_3$], [$S_4$, $E_4$], [$S_5$, $E_5$], [$S_6$,$E_6$], [$S_7$, $E_7$]]

The difference between consecutive gaming exposures can be calculated as the difference between the current start time and the previous end time. This may be expressed as follows.

$$\text{diff\_list}[(U, T)] = [(S_2 - E_1), (S_3 - E_2), (S_4 - E_3), (S_5 - E_4), (S_6 - E_5), (S_7 - E_6)] = [D_1, D_2, \ldots, D_6]$$

For each $D_i$ in the diff list variable, if the value is less than a threshold X (such as 30 minutes), the start_end_list[i] and start_end_list[i+1] entries may reasonably be presumed to be part of the same game playing session and can be collapsed to a representation by the start time for the start_end_list[i] entry and the end time for the start_end_list [i+1] entry. This process can be much more complex if the interplay between multiple fingerprints from other video contents is considered.

Referring back to FIG. 2A, data from other sources (such as hardware or viewership information) can be read (block 210), and feature generation 211 can be performed as described in greater detail below. A device-level feature database 212 can be populated with the output of the feature generation 211.

An aggregation level within the input data 204 may indicate whether only user-level (or only device-level) processing is needed or desired or whether household-level processing is also needed or desired. As a result, a determination 213 is made whether household segments are to be processed. If so, all devices in a household can be identified (block 214) for each household represented within the dataset corresponding to the input data 204. Identification of devices in a specific household may be made based on device location and other data. Features can be aggregated at the household level (block 215), and a household-level feature database 216 can be populated. The device-level feature database 212 and the household-level feature database 216 may represent the outputs of the feature engineering 201. Feature extraction and session generation (block 217) may be performed using information from the device-level feature database 212 and the household-level feature database 216.

As shown in FIG. 2B, processing with the machine learning components 202 involves receiving the output from the feature extraction and session generation (block 217) in FIG. 2A. The machine learning components 202 utilize household-level machine learning 218 and device-level machine learning 219. The household-level machine learning 218 and the device-level machine learning 219 each includes a graph neural network (GNN) layer 220, 221 to extract attention vectors. The household-level machine learning 218 also includes household embeddings 222, and the device-level machine learning 219 also includes device embeddings 223. Each of the household-level machine learning 218 and the device-level machine learning 219 further includes other features 224, 225 from a feature creation database. The household-level machine learning 218 provides the inputs for a deep neural network (DNN) model 226 to create a household segment, and the device-level machine learning 219 provides the inputs for a DNN model 227 to create a household segment.

As shown in FIG. 2C, the application 203 receives the outputs of the DNN model 226 and populates a final household segment 228. The application 203 also receives the outputs of the DNN model 227 and creates a final device segment 229. A determination 230 of whether genre-level segments are needed or desired is made based on the aggregation level specified in the input data 204. If genre-level segments are needed or desired, at least one final genre segment 231 is created.

Although FIGS. 2A through 2C illustrate one example of a process flow 200 for multi-scale multi-granular targeting for game users, various changes may be made to FIGS. 2A through 2C. For example, various components or functions in FIGS. 2A through 2C may be combined, further subdivided, replicated, rearranged, or omitted according to particular needs. Also, one or more additional components or functions may be included if needed or desired. In addition, while shown as a series of steps, various steps in FIGS. 2A through 2C may overlap, occur in parallel, occur in a different order, or occur any number of times.

Before describing in greater detail specific processes implemented by the feature engineering 201, the machine learning components 202, and the application 203, data sources used for creating user features and the weighting of such data are considered.

FIG. 3 illustrates example data sources 300 that may be used for the process flow 200 of FIGS. 2A through 2C in accordance with this disclosure. In FIG. 3, example data sources 300 are depicted, along with example data items from those data sources 300. As shown in FIG. 3, the data sources 300 may include ACR data 301, game metadata 302, hardware data 303, app usage data 304, key performance indicator (KPI) data 305, demographics data 306, mobile usage data 307, video streaming data 308, and high definition multimedia interface (HDMI) data 309.

The data from the ACR data 301 that is employed may include a start time 301a, an end time 301b, and a content type 301c for each recognized content. The data from the game metadata 302 that is employed may include a game title 302a, a game genre 302b, a game rating 302c, a game publisher 302d, and a game series 302e for each game played. The data from the hardware data 303 that is employed may include information about the type of smart television in use, such as a screen size 303a, a screen resolution 303b, a panel type 303c, and a model year 303d.

The data from the app usage data 304 that is employed may include an app identifier (ID) 304*a*, a start time 304*b*, an end time 304*c*, and an app category 304*d* for each app used. The data from the KPI log data 305 may be used to get an understanding of the television settings that the user prefers while playing a game (such as game mode) and may include a start time 305*a*, an end time 305*b*, whether game mode is enabled 305*c*, whether a gaming hub is utilized 305*d*, and a refresh rate 305*e* for each game played.

The data from the demographic data 306 that is employed may include an age 306*a*, a gender 306*b*, and location information 306*c* for each user. The data from the mobile usage data 307 may be employed to determined, for instance, games played and apps used on the mobile device and may include a start time 307*a*, an end time 307*b*, an app name 307*c*, an app category 307*d*, and game(s) played 307*e* for each game/app used. The data from the video streaming data 308 may allow determination of TV viewership data (such as the types of programs watched, any linear ads that the user interacts with, and the like) and may include a start time 308*a*, an end time 308*b*, and an identification of a streaming video 308*c* for each streaming video viewed. The data from the HDMI data 309 may provide connected device data for devices used with a smart television (such as a game console, game headsets, streaming device, etc.) and may include a start time 309*a*, an end time 309*b*, a device connected 309*c*, an HDMI port 309*d*, and whether the device is a gaming console 309*e* for each device. Other data may also be collected and used, such as data related to linear/cross-device advertising data (like clicks, impressions, etc.).

The data from the data sources 300 can be weighted and used during the feature engineering 201. In some cases, the data from the data sources 300 can be weighted in the following manner game_usage_based_weight ∈ [0..1] (based on game exposure count or session duration so that users with a lot of exposures will have higher weights)

mobile_app_game_usage_weight E [0..1] (based on mobile game app usage, with users that frequently use mobile game apps having higher weights)

game_mode_usage_weight ∈ [0..1] (for those users that use the game mode feature on their smart televisions, the weighting indicates whether the users use this feature regularly while playing games on the televisions)

screen_size (a one-hot encoded vector of bucketized screen size)

screen_resolution (a one-hot encoded vector of bucketized screen resolution)

video_streaming_weight ∈ [0..1] (if users are heavy streamers, this feature will have higher weights)

Average time b/w exposures (if two exposures are far apart, the average time will be higher and may indicate a user is stuck at a certain stage in a game)

tv usage weight ∈ [0..1] (based on viewership so that users who watch a lot of television will have higher weights)

tv app usage weight ∈ [0..1] (based on TV app viewership so that users who watch television apps often will have higher weight)

click weight ∈ [0..1] (based on ad clicks so that users who click on ads often will have higher weight)

impression weight ∈ [0..1] (based on ad impressions so that users who get ad impressions often will have higher weights).

In some embodiments, the feature engineering pipeline in the feature engineering 201 uses a combination of one-hot encoding and word2vec algorithms to create the features. A variational autoencoder algorithm may also be used, such as to identify outliers in the data. Various models can be pretrained, which saves considerable time in running the pipeline.

Although FIG. 3 illustrates one example of data sources 300 that may be used for the process flow 200 of FIGS. 2A through 2C, various changes may be made to FIG. 3. For example, the process flow 200 may use any suitable data from any suitable data source(s) and is not limited to the specific data and data sources shown in FIG. 3.

Figure 4:
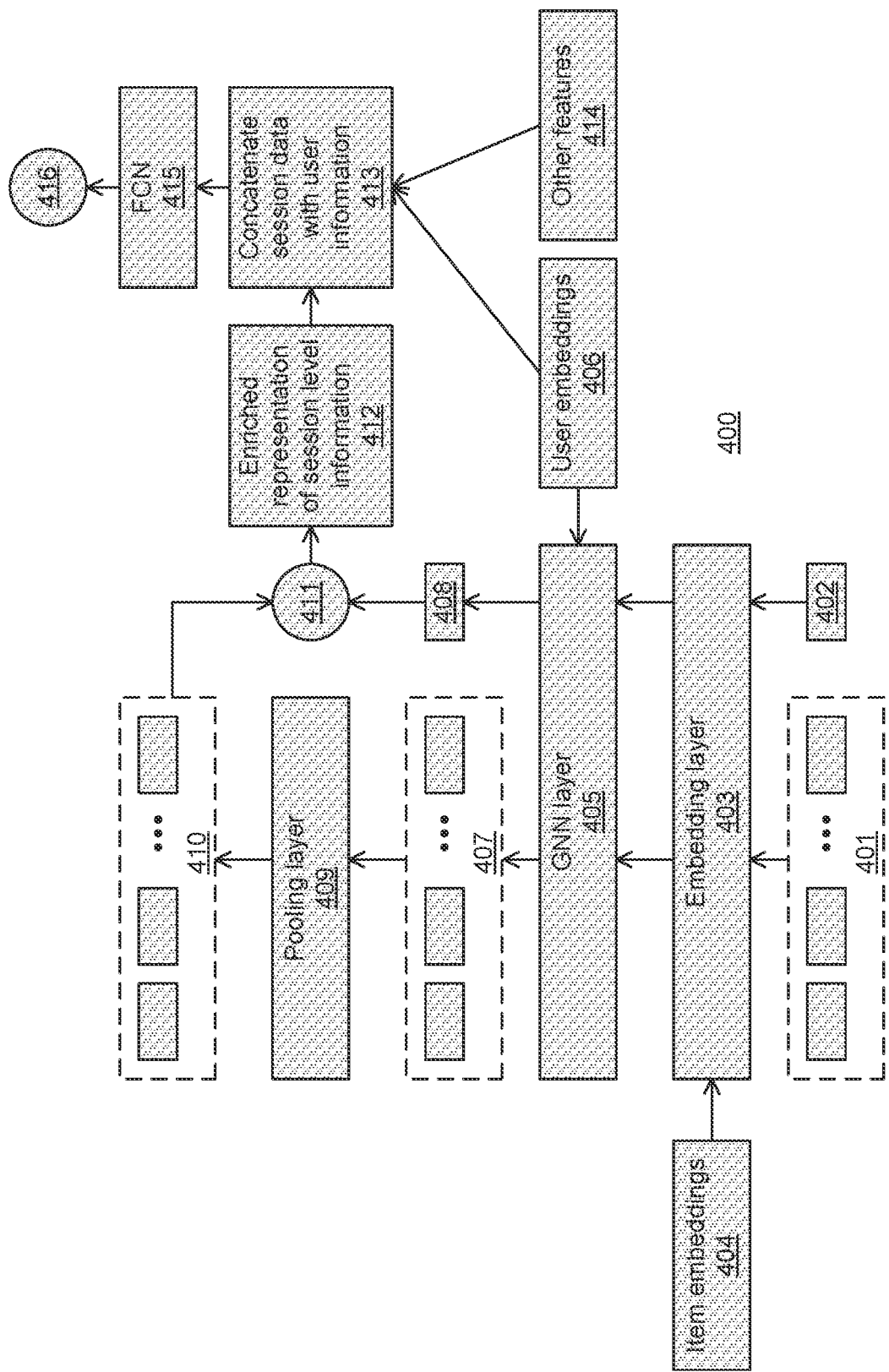

FIGS. 4 and 4A illustrate an example system 400 supporting a sequence-based approach for device-level targeting as part of multi-scale multi-granular targeting for game users and related details in accordance with this disclosure. For ease of explanation, the system 400 shown in FIGS. 4 and 4A is described as being implemented on or supported by one or more components in the network configuration 100 of FIG. 1, such as the electronic device 101, the server 106, or both. However, the system 400 could be used with any other suitable device(s) and in any other suitable system(s). Moreover, the system 400 shown in FIGS. 4 and 4A is described as being implemented for the process flow 200 of FIG. 2, although the system 400 could be used with any other suitable process(es).

As shown in FIG. 4, gaming exposure data 401 for historical gaming sessions for each user and device and gaming exposure data 402 for a current gaming session are received by an embedding layer 403. The historical sessions of a user can have a significant impact on the user's current preferences. In the model formulation of the embodiment in FIG. 4, each historical session is a fixed time window (which may be defined, for example, as two hours or other time period), and user interactions that happen within that time window are part of the session. The embedding layer 403 embeds item embeddings 404 into the data 401 and 402. For example, at least the game titles may be embedded, although a much richer session representation may be obtained if other actions that the user performed in the same session are embedded along with the game titles. Examples of other actions may include whether the game mode feature was turned on during the session, whether a game headset was also connected to the television, etc. The embeddings created may take into account multiple factors, unlike traditional approaches where only the game title is considered for the embeddings.

Data for one or more "stitched" sessions (where the stitching has been described above) and all titles appearing within the predefined time window can be used to define a graph structure. For example, the outputs of the item embedding layer 403, which can continue maintaining the current session data separately from the historical data, can be received by a GNN layer 405. The GNN layer 405 uses the outputs of the item embedding layer 403, together with user embeddings 406, to create a graph capturing how a user interacted with game titles in the session(s). In some cases, the GNN layer 405 is a state-of-the-art model to extract session-level embeddings, and session-level graph data is fed into the GNN layer 405 to extract session embeddings. Significantly, a copy of the user embeddings 406 can be passed to the GNN layer 405, unlike traditional GNNs that would not inherently consider user embeddings when updating a graph at training time. The implementation of FIG. 4 may therefore be called a "session aware" recommendation system and is an improvement over strictly session-based recommendation systems.

In some embodiments, the GNN layer 405 constructs graphs from user gaming exposures in the manner illustrated by FIGS. 5A and 5B. FIGS. 5A and 5B illustrate an example of creating a subgraph for each session using a GNN layer 405 within FIG. 4 in accordance with this disclosure. In this example, FIG. 5A depicts game playing session data for a user, and FIG. 5B depicts a corresponding subgraph. In the example shown in FIG. 5A, for five game titles ("A," "B," "C," "D," and "E"), the gaming exposure data 401 for historical gaming sessions 501 includes (i) a first session in which the user starts with title "D" and transitions to title "B," then to title "C," and finally to title "D"; (ii) a second session in which the user starts with title "B" and transitions to title "C" and then to title "E"; and (iii) a third session in which the user starts with title "A" and transitions to title "C," then to title "A," and finally to title "B." The gaming exposure data 402 for a current gaming session 502 includes the user starting with title "A" and transitioning to title "C" and then to title "D."

The corresponding subgraph shown in FIG. 5B is constructed from the session data for the historical gaming session 501 and the current gaming session 502 and includes the five titles and the number (specified directionally) of transitions therebetween. The user transitioned twice from title "A" to title "C" and once from title "C" to title "A." From title "C," the user transitioned twice to title "D" and twice to title "E." The user transitioned twice from title "D" to title "B" and twice from title "B" to title "C." The user never transitioned from title "A" to either of title "D" or title "E." The user also never transitioned from title "B" to any of titles "A," "D," or "E," never transitioned from title "C" to either of title "B" or title "E," never transitioned from title "D" to any title other than title "B," and never transitioned from title "E" to any other title.

Referring back to FIG. 4, the outputs of the GNN layer 405 include historical item transition relationships 407 and current session item relationships 408. Once the historical item transition relationships 407 and current session item relationships 408 are determined, the historical item transition relationships 407 are passed through a pooling layer 409 to obtain a single representation of all historical sessions in a single vector 410. For example, the historical item transition relationships 407 may be received by the pooling layer 409, which may combine those historical item transition relationships 407 for the session-level embeddings to form session-level transition relationships with embeddings in the form of a historical session vector 410.

A dot product between the historical session vector 410 and a vector representing the current session item relationships 408 gives a representation of the dependency between the two vectors. In some cases, the historical session vector 410 for session-level transition relationships (with embeddings) and the vector representing the current session item relationships 408 for the current session item relationships are received by an attention layer 411. The attention layer 411 can determine the relationship between past and current gaming sessions. For example, the attention layer 411 may implement the following softmax function.

$$\text{Attention}(Q, K, V) = \text{softmax}\left(\frac{QK^T}{\sqrt{d_k}}\right)V,$$

Here, Q is a query, K is a key, and V is a value. The attention layer 411 produces a session-level representation of the user gaming behavior, such as an enriched representation 412 of session-level information. Once obtained, that feature space can be further enhanced by augmenting the vector with the user embeddings 406 and some other features 414 (such as hardware features, television watching behaviors, etc.). In some cases, the enriched representation 412 of session-level information is concatenated with the user embeddings 406 and optionally the other features 414 to form concatenated session data 413 with the user information.

The concatenated session data 413 is received by a DNN model, which is a fully-connected network (FCN) 415 in the example of FIG. 4, to predict the likelihood of the user playing a specific game title next. The FCN 415 is a feed-forward neural network that takes in the concatenated session data 413 as input and predicts the probability of the user playing a game title next, such as by using a sigmoid function. FIG. 4A depicts one example embodiment of the FCN 415 in greater detail. In this example, the FCN 415 implements a series of hidden layers 420-422. Each hidden layer 420-422 uses a function that applies weights to its inputs (such as the concatenated session data 413 for the hidden layer 420 and the outputs of the prior hidden layer within the sequence for each of the hidden layers 421 and 422) and directs those inputs through an activation function (such as a sigmoid function) to produce its outputs. An output 416 of the FCN 415 is a probability of the target game title being played by each user. Collectively, the hidden layers 420-422 can implement a decision layer identifying whether the user will play title "X" next. In some cases, if the probability is greater than 0.5, the output 416 that is generated for that game title is 1; otherwise, the output 416 that is generated for that game title is 0. Those skilled in the art will recognize that, while this example embodiment utilizes an FCN 415, the FCN 415 can be replaced with any other suitable architectures, such as a convolutional neural network (CNN), a deep reinforcement learning layer, etc.

Although FIGS. 4 and 4A illustrate one example of a system 400 supporting a sequence-based approach for device-level targeting as part of multi-scale multi-granular targeting for game users and related details, various changes may be made to FIGS. 4 and 4A. For example, various components or functions in FIGS. 4 and 4A may be combined, further subdivided, replicated, rearranged, or omitted according to particular needs. Also, one or more additional components or functions may be included if needed or desired. Although FIGS. 5A and 5B illustrate one example of creating a subgraph for each session using a GNN layer 405 within FIG. 4, various changes may be made to FIGS. 5A and 5B. For instance, any other suitable technique may be used to create a subgraph for each session.

Figure 6:
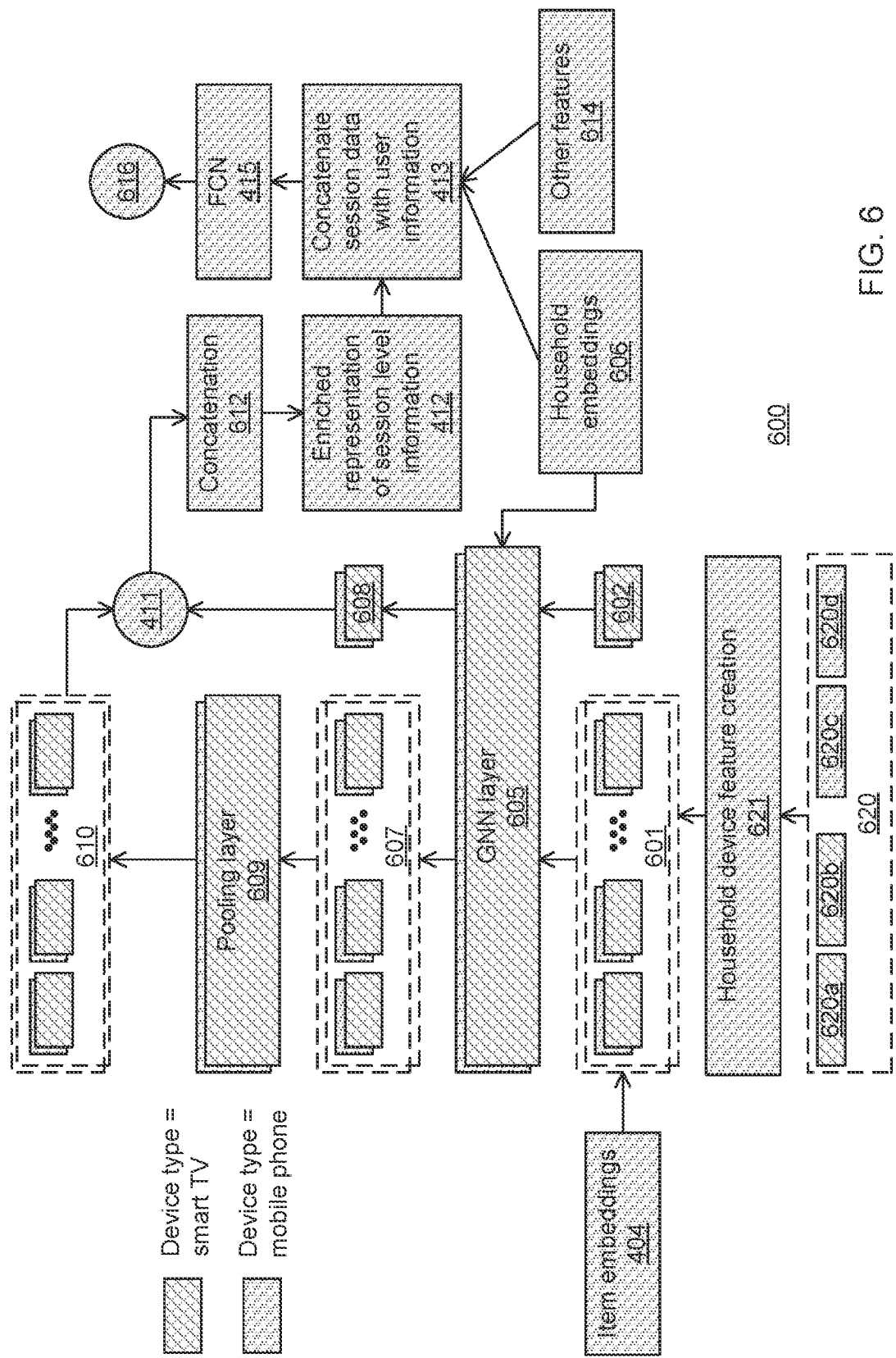
FIG. 6 illustrates an example system supporting a sequence-based approach for household-level targeting as part of multi-scale multi-granular targeting for game users in accordance with this disclosure.

FIG. 6 illustrates an example system 600 supporting a sequence-based approach for household-level targeting as part of multi-scale multi-granular targeting for game users in accordance with this disclosure. For ease of explanation, the system 600 shown in FIG. 6 is described as being implemented on or supported by one or more components in the network configuration 100 of FIG. 1, such as the electronic device 101, the server 106, or both. However, the system 600 could be used with any other suitable device(s) and in any other suitable system(s). Moreover, the system 600 shown in FIG. 6 is described as being implemented for the process flow 200 of FIG. 2, although the system 600 could be used with any other suitable process(es). Since FIG. 6 is largely similar to FIG. 4, functionality that remains the same or similar will not be repeated below.

The system 600 shown in FIG. 6 is used to accumulate data for a plurality of devices for a single household, where the data can be processed according to device type. In the example shown in FIG. 6, a set 620 of devices for a single household includes four devices, namely two smart televisions 620a-620b and two mobile phones 620c-620d. As discussed above, the devices for a household may be identified in any suitable manner, such as based on device location (taken alone or in combination with other information relating to the device(s) and/or user(s)). Those skilled in the art will understand that the system 600 can be readily scaled to a larger number of devices and also to a larger number of device categories. For example, computers (such as desktop and/or laptop computers) that are used for gaming may be treated separately from smart televisions and mobile phones (even if apps are used on the computer for game play), and the categories may also be expanded to specifically include gaming consoles as a separate category. Moreover, those skilled in the art will recognize that multiple users may be associated with a particular device (such as a smart television 620b) and that the discussions of user-specific data in connection with FIG. 4 are applicable even if not explicitly stated below.

Since the feature engineering 201 creates features at the device level, device-level features can be aggregated to the household level. This can be accomplished using a computation layer household device feature creation layer 621, which may use an autoencoder approach discussed in detail in connection with FIGS. 9 and 9A. For each household, a household embedding matrix (formed from household embeddings 606) can be created to represent features for that household. That is, gaming exposure data for historical and current gaming sessions for each device (and each user) can be received by the household device feature creation layer 621, which aggregates the gaming exposure data by category. As a result, the historical gaming session gaming exposure data 601 may include separate datasets for different device categories and can be embedded with the item embeddings 404 (although not explicitly depicted for simplicity, one or more instances of the embedding layer 403 may perform the embedding). Likewise, the current gaming session gaming exposure data 602 may include separate datasets for different device categories. These can be separately processed (such as sequentially or in parallel) by at least one GNN layer 605, which may operate in the same or similar manner as described above in connection with FIG. 4. The outputs of the GNN layer(s) 605 are also provided with a copy of household embeddings 606. The household embeddings 606 may include at least the user embeddings 406.

The GNN layer(s) 605 may operate to construct separate graphs (such as by device category) for the user gaming exposures to produce sets of historical item transition relationships 607 and sets of current session item relationships 608 (each of which may also be by device category). At least one pooling layer 609 operates on the sets of historical item transition relationships 607, such as in the same or similar manner as discussed above for the pooling layer 409, to produce individual representations 610 of the historical sessions as a single vector (such as for each device category). The attention layer 411 operates on the individual representations 610 output by the pooling layer(s) 609 and vectors representing the current session item relationships 608 for the current gaming sessions (such as by device category). Concatenation (at block 612) can be performed on the outputs of the attention layer 411 for the various device categories. Concatenation of session data with user information (to form concatenated session data 413) can be performed using the household embeddings 606 and other features 614 (which may or may not differ from the other features 414).

As is apparent here, the model formulation in FIG. 6 is very similar to the device model employed in FIG. 4. However, in this case, there may be multiple separate GNN layers 605 that are trained simultaneously for (i) extracting information from smart television sessions and (ii) extracting information from mobile phone sessions. The attention layer 411 is applied to the outputs of both the GNN layers 605 and the current session vectors 608 for each device type. The attention outputs can be concatenated (at block 612) to create the final session feature representation for the household. The concatenated household session vector output by the concatenation layer (block 612) can be augmented with some more features (to form an enriched representation 412) to enrich the vector space even further, and the enriched representation can be passed through a classifier model (FCN 415) to make final predictions 616. Again, a DNN architecture applying a sigmoid function may be used in some cases to perform this operation and calculate the probabilities for each title.

In some embodiments, the pipeline used for the feature engineering 201 for the models of FIGS. 4 and 6 can be completely offline since the start and end times are user inputs. Note that the terms "offline" and "online" are simply meant to refer to different levels of data interaction with one or more user devices (such as the electronic device or devices 101, 102, 104) on which gaming exposures occur. In one example, the electronic device 101 may be a smart television, and the electronic device 102 may be a smart phone (both of which may be used by the same user for gaming) Also, there is a lot of overlap since the same features may need to be created again and again. In some cases, the pipeline can be designed in a way where the features may be reused, reducing the time to run during training and inference.

Although FIG. 6 illustrates one example of a system 600 supporting a sequence-based approach for household-level targeting as part of multi-scale multi-granular targeting for game users, various changes may be made to FIG. 6. For example, various components or functions in FIG. 6 may be combined, further subdivided, replicated, rearranged, or omitted according to particular needs. Also, one or more additional components or functions may be included if needed or desired.

FIGS. 7 and 8 illustrate examples of how feature aggregation may work for categorical features in the process flow 200 of FIG. 2 in accordance with this disclosure. More specifically, FIG. 7 illustrates an example for metadata features, and FIG. 8 illustrates an example for time-based features.

As shown in FIG. 7, feature aggregation for metadata categorical features is shown. Since a user most likely will have multiple interactions with a smart television while playing a game (as well as before and afterwards), metadata features corresponding to user behavior can be aggregated. For instance, each game title may correspond to multiple genres, and multi-hot encoding may be used to represent the genre features for each exposure as shown in FIG. 7. In the example depicted, there are three genres for all game titles of interest as shown by "Action," "Role-playing," and "First person" corresponding to the three columns on the left side of FIG. 7. There are also four game title rating values of "E10+," "A," "M," and "T" corresponding to the columns on the right side of FIG. 7. A user has two exposures corresponding to the top rows in FIG. 7. The first exposure is with a game title in genres of both "Action" and "Role-playing" and both rated as "T." The second exposure is with a game title in genres of both "Role-playing" and "First person" and rated "A." An aggregation (maximum, average, etc.) of the two exposures may correspond to the final genre vector for the user. In this scenario, using averaging as the aggregation technique, the final vectors could be computed as shown in the bottom rows of FIG. 7, where [0.5,1,0.5] is the average for the metadata category genre and [0,0.5,0,0.5] is the average for the metadata category rating.

As shown in FIG. 8, feature aggregation for time-based categorical features is shown. Gaming behavior tends to be extremely correlated with the time when a game is played. For example, users may typically be more active during weekends and during the late hours of the day. For each exposure, one-hot encoding may be used on an hour and day-of-week basis, and the resulting vectors may be averaged to obtain a final representation of a user's time preference. In the example of FIG. 8, which relates solely to the day of the week, a user has three exposures on Saturday, two exposures on Monday, five exposures on Friday, and none on any other day (for a total of 10 exposures during the week). The vector calculation represents the number of exposures as a decimal for value the fraction of the total, which in this example results in 0.3 for Saturday, 0.2 on Monday, and 0.5 on Friday.

Although FIGS. 7 and 8 illustrate examples of how feature aggregation may work for categorical features in the process flow 200 of FIG. 2, various changes may be made to FIGS. 7 and 8. For example, the specific contents shown in FIGS. 7 and 8 are for illustration and explanation only. Also, any other suitable techniques may be used for feature aggregation.

Figure 9:
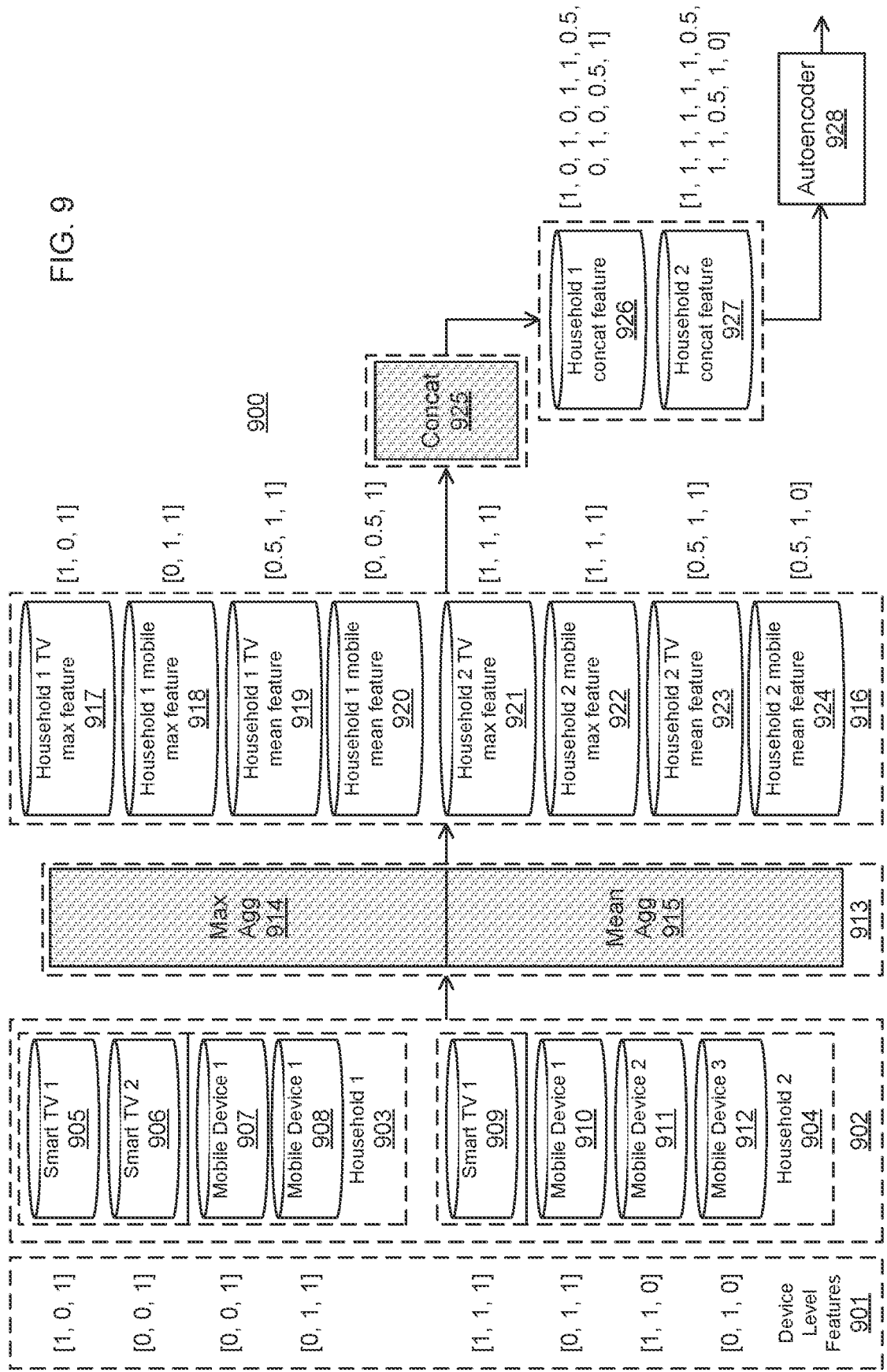
FIGS. 9 and 9A illustrate example operation of the pipeline for feature engineering of FIG. 2A in accordance with this disclosure.
Figure 9A:
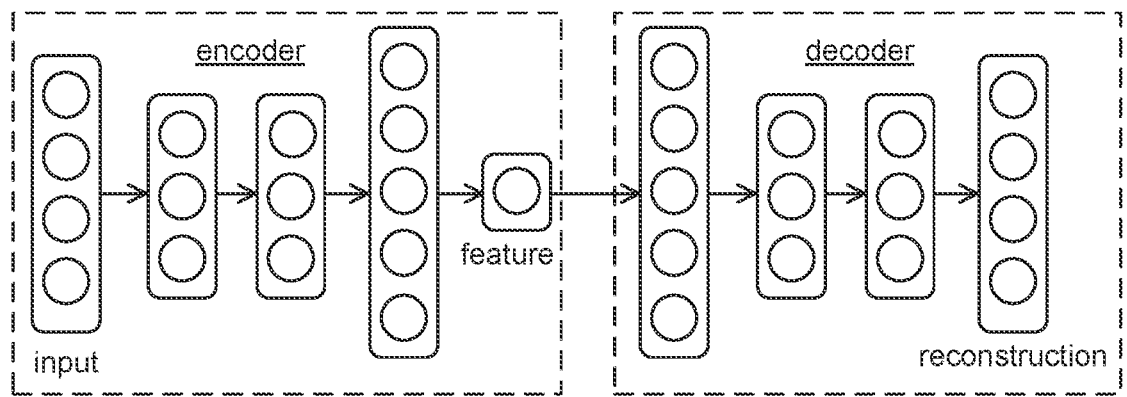

FIGS. 9 and 9A illustrate example operation 900 of the pipeline for feature engineering 201 of FIG. 2A in accordance with this disclosure. In this example, features are created at the device level, such as is explained above in connection with FIGS. 3, 4, 7, and 8. Once features for each device in a household are aggregated as discussed in connection with FIG. 6, features are also created at the household level. As shown in FIG. 9, the operations 900 illustrate this process, where the example shown relates to a feature vector length of three in device-level features 901 and to two households 902, namely household 1 903 (which has two smart televisions 905-906 and two mobile devices 907-908) and household 2 904 (which has one smart television 909 and three mobile devices).

As can be seen in FIG. 9, an aggregation layer 913 is introduced. While two aggregations (a maximum aggregation 914 and a mean aggregation 915) are illustrated, the number of aggregations could be changed to any desired number. The aggregation layer 913 generates feature vectors for each device type (smart televisions and mobile devices in this embodiment) by household. In this case, this results in the generation of a household 1 television max feature 917, a household 1 mobile max feature 918, a household 1 television mean feature 919, a household 1 mobile max feature 920, a household 2 television max feature 921, a household 2 mobile max feature 922, a household 2 television mean feature 923, and a household 2 mobile max feature 924.

The output of the aggregation layer 913 is concatenated to generate a single vector for each household, which in the example creates a household 1 concat feature vector 926 and a household 2 concat feature vector 927. Those vectors are passed through an autoencoder network 928 to extract a lower-dimensional representation of the same size as the input features. This provides the flexibility to use the same model structure for individual- and household-level predictions. FIG. 9A illustrates example operation of the autoencoder network 928. The size of the latent dimension of the output feature is the same size as the input feature vector size.

Although FIGS. 9 and 9A illustrate one example of operation 900 of the pipeline for feature engineering 201 of FIG. 2A, various changes may be made to FIGS. 9 and 9A. For example, various components or functions in FIGS. 9 and 9A may be combined, further subdivided, replicated, rearranged, or omitted according to particular needs. Also, one or more additional components or functions may be included if needed or desired.

Figure 10:
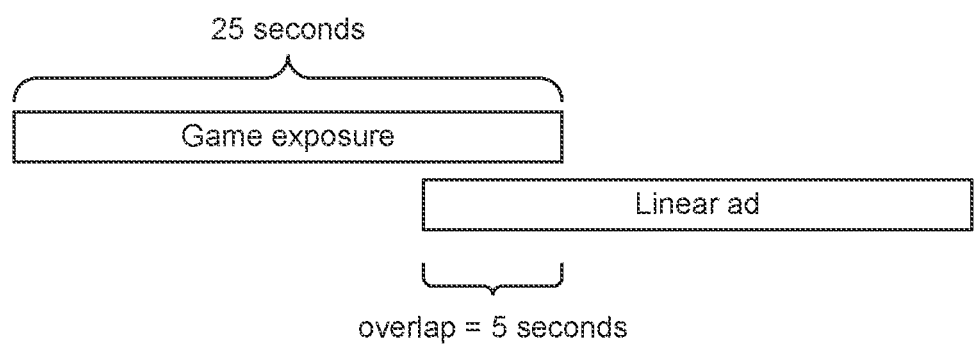
FIG. 10 illustrates example operation of a multi-match check algorithm for the feature engineering in FIG. 2A in accordance with this disclosure.

FIG. 10 illustrates example operation of a multi-match check algorithm (block 208) for the feature engineering 201 in FIG. 2A in accordance with this disclosure. In many instances, the time period of a gaming exposure is identified as including a different content type by a content recognition system, such as a linear ad (in the example shown here). To quantify this occurrence, a custom metric called an "overlap score" can be used. In some embodiments, the overlap score can be defined as the sum of the overlapping fractions of individual (non-gaming) content with a game exposure. For the example illustrated in FIG. 10, the overlap score for a game exposure overlapping with a linear ad can be expressed as follows.

$$\text{overlap\_frac}_{ad} = \frac{5}{25} = 0.2$$

Here:

$$\text{overlap score} = \text{overlap}\_frac_{content_1} + \text{overlap}\_frac_{content_2} + \text{overlap}\_frac_{content\_3} +$$

In other words, for n overlapping contents:

$$\text{overlap score} = \sum_{i=1}^{n} \text{overlap\_frac}_{content\_i}.$$

Figure 11:
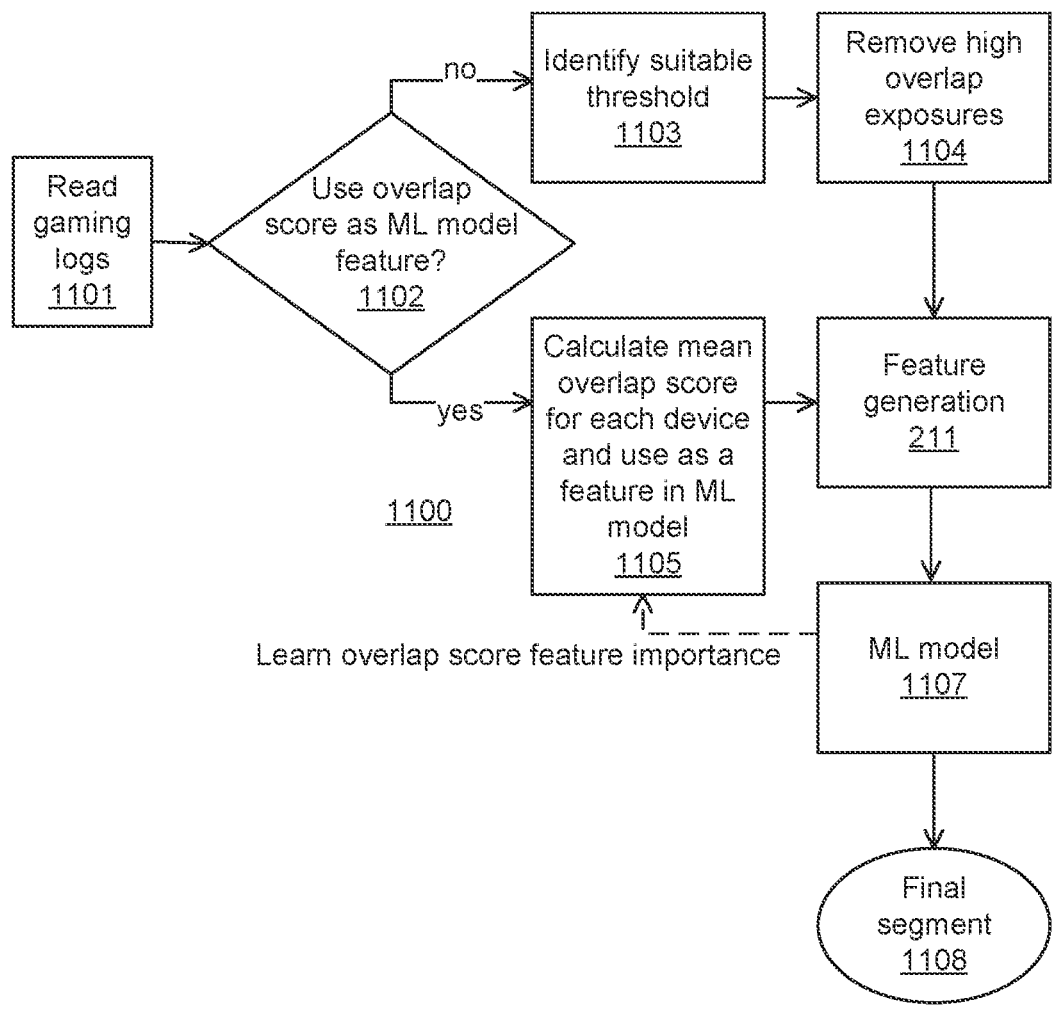
FIG. 11 illustrates examples of using an overlap score determined as shown in FIG. 10 in accordance with this disclosure.

FIG. 11 illustrates examples of using an overlap score determined as shown in FIG. 10 in accordance with this disclosure. In some embodiments, a multi-match metric may be employed in different ways, which are illustrated in FIG. 11. First, to eliminate any exposures with overlap and only consider exposures with the highest degree of confidence, a reasonable threshold on the overlap score may be identified as a predefined overlap score threshold. Any game exposure with an overlap score exceeding that predefined overlap score threshold may be eliminated from use. While a threshold value of one might seem reasonable, since that value signifies game exposures that completely overlap with other contents and hence are not very reliable, that value (while very precise) may lead to an unnecessary loss of information. A somewhat higher or lower predefined overlap score threshold may be used to ensure precision in determination of game exposure duration.

Second, the average overlap score for a user may itself be used as a feature and be fed into a machine learning model. Weights determined by training the machine learning model (such as in a supervised setting) can indicate the importance of the overlap score in influencing the model's predictive power. In some cases, the feature importance may be extracted from a weight vector W of an activation function (WX+b), where X represents the values for the features, and b is a bias term. In this case, even though there are some overlapping exposures used to create the features, the machine learning model can learn interesting patterns in the data.

The two approaches describe above for using an overlap score determined as shown in FIG. 10 are illustrated in FIG. 11 and form a process for creating "clean" gaming exposures as mentioned above. In the process 1100, gaming logs are read (block 1101), and a determination is made as to whether an overlap score is to be used as a machine learning feature (block 1102). If not, a suitable threshold is identified (block 1103), and any high overlap exposures are eliminated (block 1104). The remaining "clean" gaming exposures (after removing high overlap exposures) are provided to the feature generation 211 and to a machine language model 1107 (such as DNN model 227). If the overlap score is to be used as a machine learning feature, a mean overlap score for each device is calculated (block 1105) and used as a feature for a machine learning model. The mean overlap score per device can be provided to the feature generation 211 and used by machine language model 1107. The machine language model 1107 may feed back, to the machine language model used in block 1105, an indication of the importance of the overlap score on predicting the next game title likely to be played by a user. The machine language model 1107 outputs the final segment data 1108 for each device, which can be used to populate the device-level feature database 212.

Although FIG. 10 illustrates one example of operation of a multi-match check algorithm for the feature engineering 201 in FIG. 2A and FIG. 11 illustrates examples of using an overlap score determined as shown in FIG. 10, various changes may be made to FIGS. 10 and 11. For example, various components or functions in FIGS. 10 and 11 may be combined, further subdivided, replicated, rearranged, or omitted according to particular needs. Also, one or more additional components or functions may be included if needed or desired. In addition, while shown as a series of steps, various steps in FIG. 11 may overlap, occur in parallel, occur in a different order, or occur any number of times.

Figure 12:
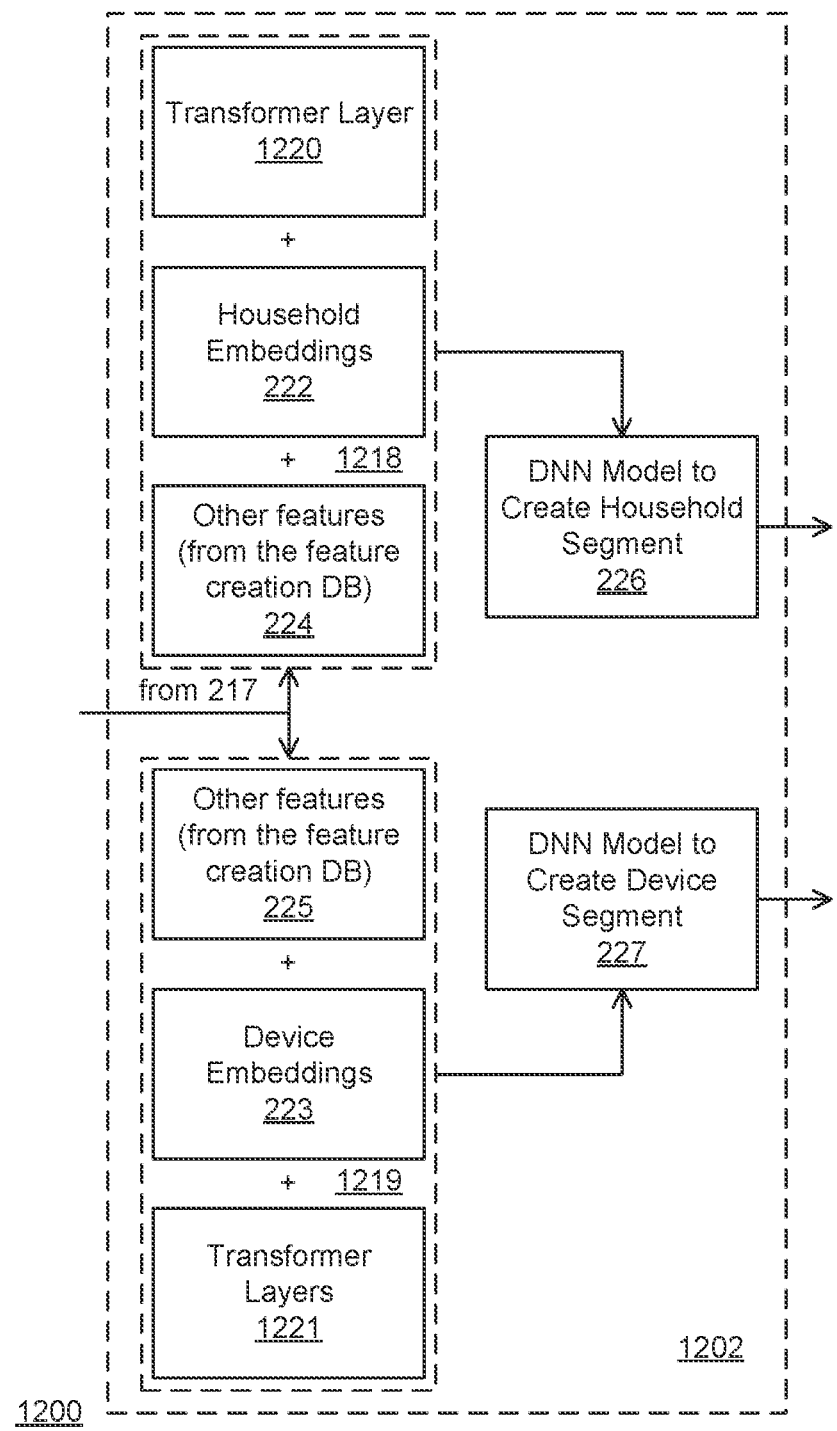
FIG. 12 illustrates an example alternate embodiment for machine learning components of a process flow for multi-scale multi-granular targeting for game users in accordance with this disclosure.
Figure 13:
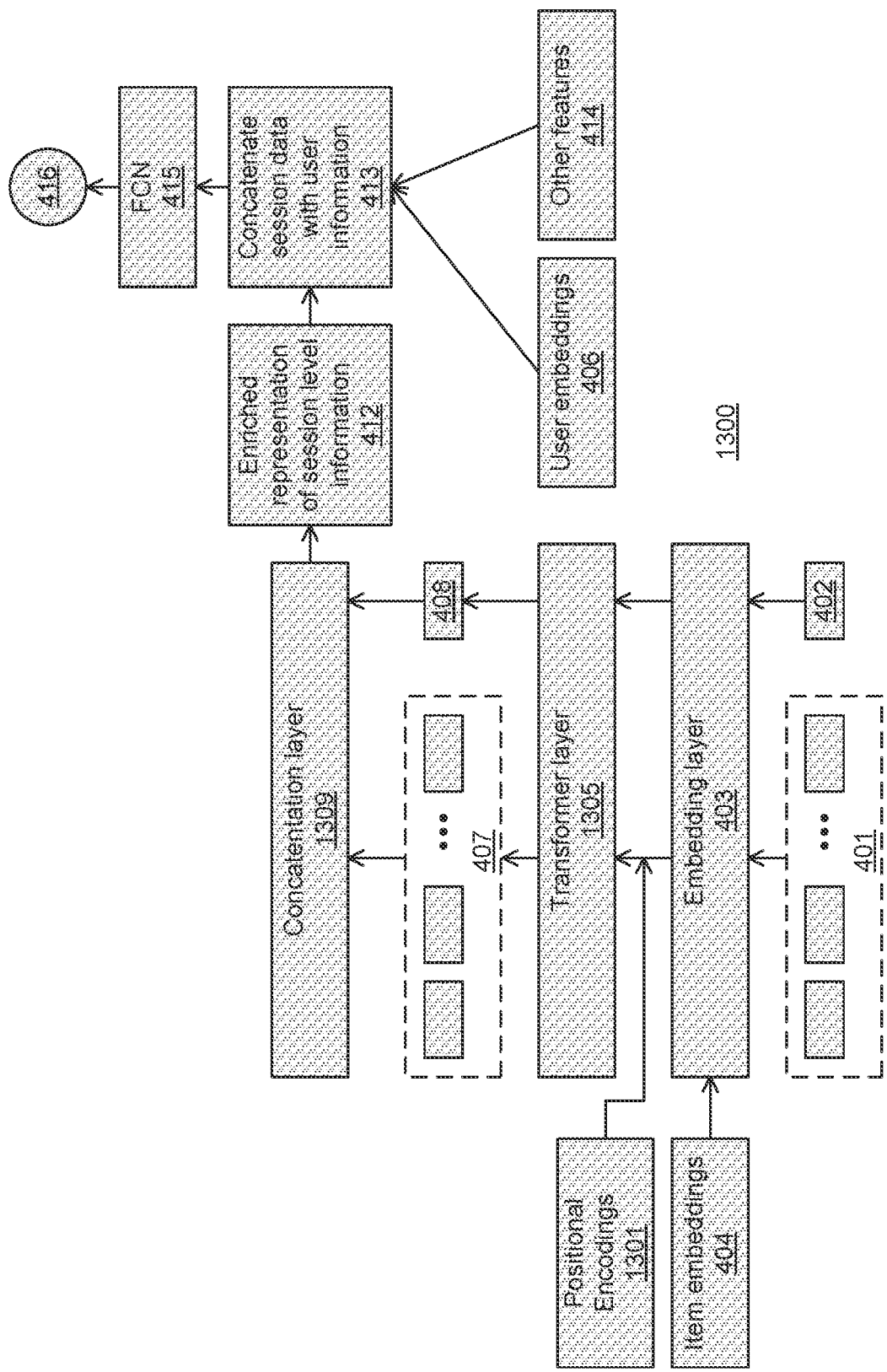
FIG. 13 illustrates an example alternate system supporting a sequence-based approach for device-level targeting implemented for the process flow of FIG. 12 in accordance with this disclosure.

FIG. 12 illustrates an example alternate embodiment for machine learning components of a process flow 1200 for multi-scale multi-granular targeting for game users in accordance with this disclosure. FIG. 13 illustrates an example alternate system 1300 supporting a sequence-based approach for device-level targeting implemented for the process flow 1200 of FIG. 12 in accordance with this disclosure. The process flow 1200 uses the same feature engineering 201 and application 203 as the process flow 200 described above. For simplicity and clarity, the descriptions of those portions of the process flow 1200 are not repeated. In addition, much of the machine learning components 1202 for the process flow 1200 are the same as or similar to the machine learning components 202 depicted in FIG. 2B as described above. However, household-level machine learning 1218 and device-level machine learning 1219 differ from the household-level machine learning 218 and the device-level machine learning 219 in that the GNN layers 220-221 are replaced with transformer layers 1220-1221, respectively.

Likewise, much of the system 1300 in FIG. 13 is the same as or similar to the system 400 in FIG. 4. However, the GNN layer 405 is replace with a transformer layer 1305. Positional encodings 1301 are introduced to format the gaming exposure data 401 for historical gaming sessions for each user and device received by an embedding layer 403. In addition, the pooling layer 409 and the attention layer 411 are replaced a concatenation layer 1309, which receives and concatenates the historical item transition relationships 407 and the current session item relationships 408 to form the enriched representation 412.

Figure 14:
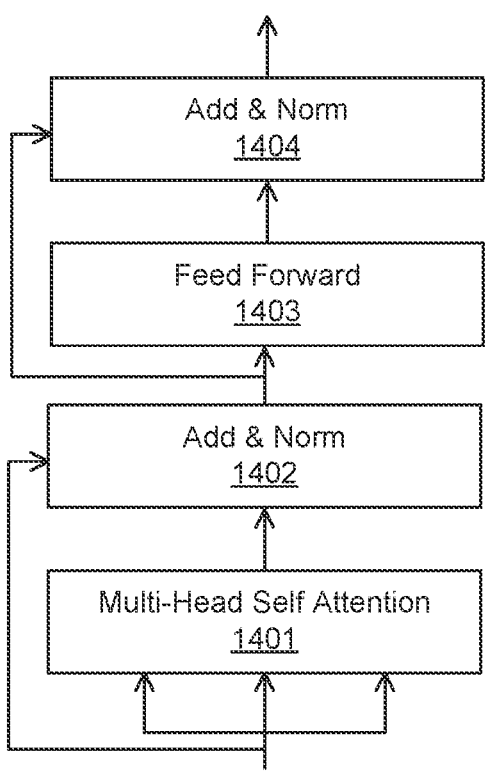
FIG. 14 illustrates an example transformer layer for use in the system of FIG. 13 in accordance with this disclosure.

FIG. 14 illustrates an example transformer layer 1305 for use in the system 1300 of FIG. 13 in accordance with this disclosure. As shown in FIG. 14, the transformer layer 1305 receives the input for the transformer at a multi-head self-attention layer 1401, integrating a self-attention mechanism and multilayer perceptron. The input to the transformer layer 1305 is also received at an addition and normalization layer 1402, which adds the vectors from the input and from the output of the multi-head self-attention layer 1401 and normalizes the result. The output of the addition and normalization layer 1402 is received by a feed forward neural network 1403 and by an addition and normalization layer 1404. The feed forward neural network 1403 may represent a single-layer perceptron network. The addition and normalization layer 1404 adds the vectors from the addition and normalization layer 1402 and from the feed forward neural network 1403 and normalizes the result as an output of the transformer layer 1305.

Although FIGS. 12 through 14 illustrate one example of an alternate embodiment for machine learning components of a process flow 1200 for multi-scale multi-granular targeting for game users and one example of an alternate system 1300 supporting a sequence-based approach for device-level targeting implemented for the process flow 1200 and related details, various changes may be made to FIGS. 12 through 14. For example, various components or functions in FIGS. 12 through 14 may be combined, further subdivided, replicated, rearranged, or omitted according to particular needs. Also, one or more additional components or functions may be included if needed or desired.

It should be noted that the functions shown in or described with respect to FIGS. 2A through 14 can be implemented in an electronic device 101, server 106, or other device(s) in any suitable manner. For example, in some embodiments, at least some of the functions shown in or described with respect to FIGS. 2A through 14 can be implemented or supported using one or more software applications or other software instructions that are executed by the processor 120 of the electronic device 101, server 106, or other device(s). In other embodiments, at least some of the functions shown in or described with respect to FIGS. 2A through 14 can be implemented or supported using dedicated hardware components. In general, the functions shown in or described with respect to FIGS. 2A through 14 can be performed using any suitable hardware or any suitable combination of hardware and software/firmware instructions.

Figure 15:
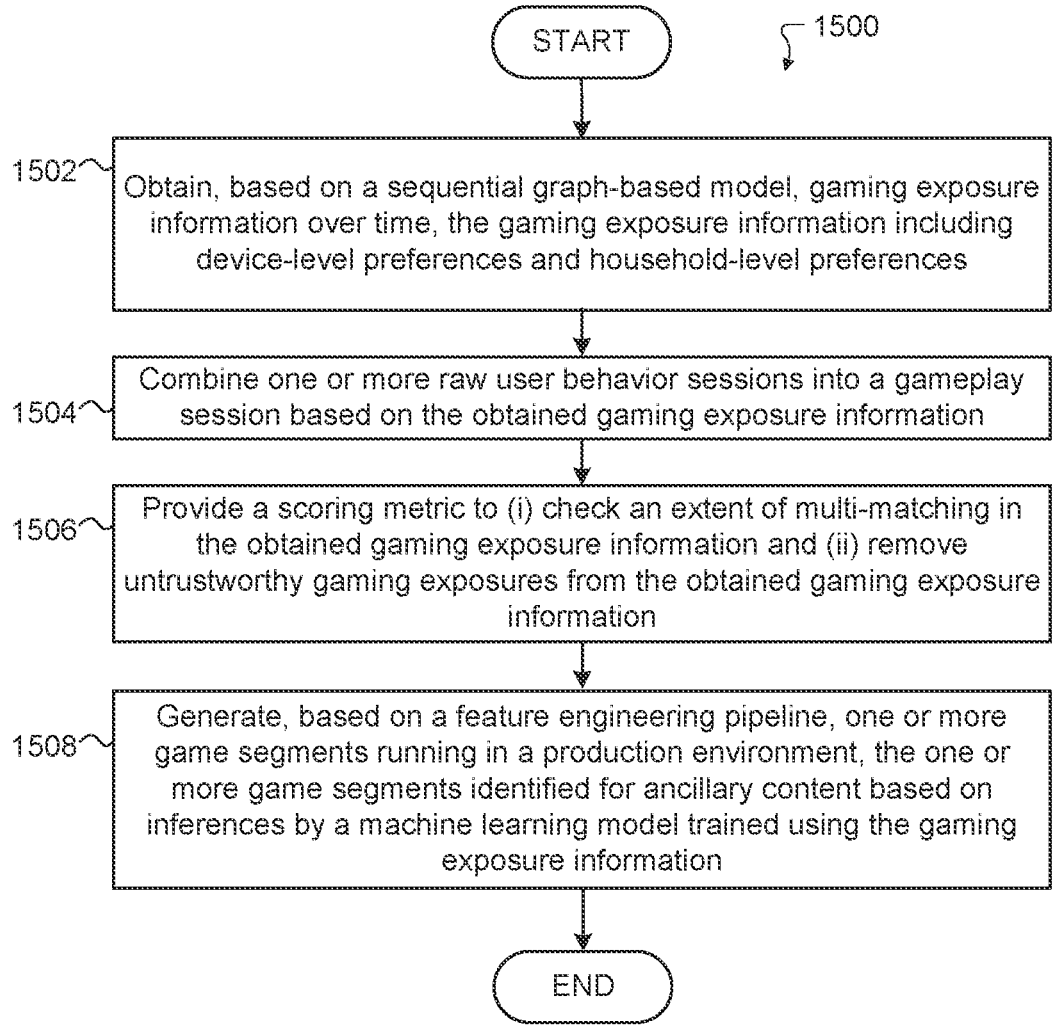
FIG. 15 illustrates an example method for multi-scale multi-granular targeting for game users in accordance with this disclosure.

FIG. 15 illustrates an example method 1500 for multi-scale multi-granular targeting for game users in accordance with this disclosure. For ease of explanation, the method 1500 is described with reference to the process flow 200 and the system 600. However, the method 1500 may be employed with any suitable process flow and system and may be readily modified to accommodate variations in the underlying process flow and/or system.

As shown in FIG. 15, based on a sequential graph-based model, gaming exposure information over a predefined time window, including device-level preferences and household-level preferences, is obtained (step 1502). For example, the gaming exposure information may be obtained by the feature extraction and session generation (block 217) in FIG. 2A. One or more raw user behavior sessions are combined (or "stitched") into a gameplay session based on the obtained gaming exposure information (step 1504). Stitching sessions may be performed using clean exposures as shown in block 209 of FIG. 2A, for example. A scoring metric is provided to (i) check an extent of multi-matching in the obtained gaming exposure information and (ii) remove untrustworthy gaming exposures from the obtained gaming exposure information (step 1506). This may include, for example, identifying multi-match ratios for all exposures as shown in block 208 of FIG. 2A and depicted and described in greater detail in connection with FIGS. 10 and 11. Based on a feature engineering pipeline, one or more game segments running in a production environment are identified for ancillary content based on inferences by a machine learning model trained using the gaming exposure information (step 1508).

Although FIG. 15 illustrates one example of a method 1500 for multi-scale multi-granular targeting for game users, various changes may be made to FIG. 15. For example, while shown as a series of steps, various steps in FIG. 15 may overlap, occur in parallel, occur in a different order, or occur any number of times.

Figure 16:
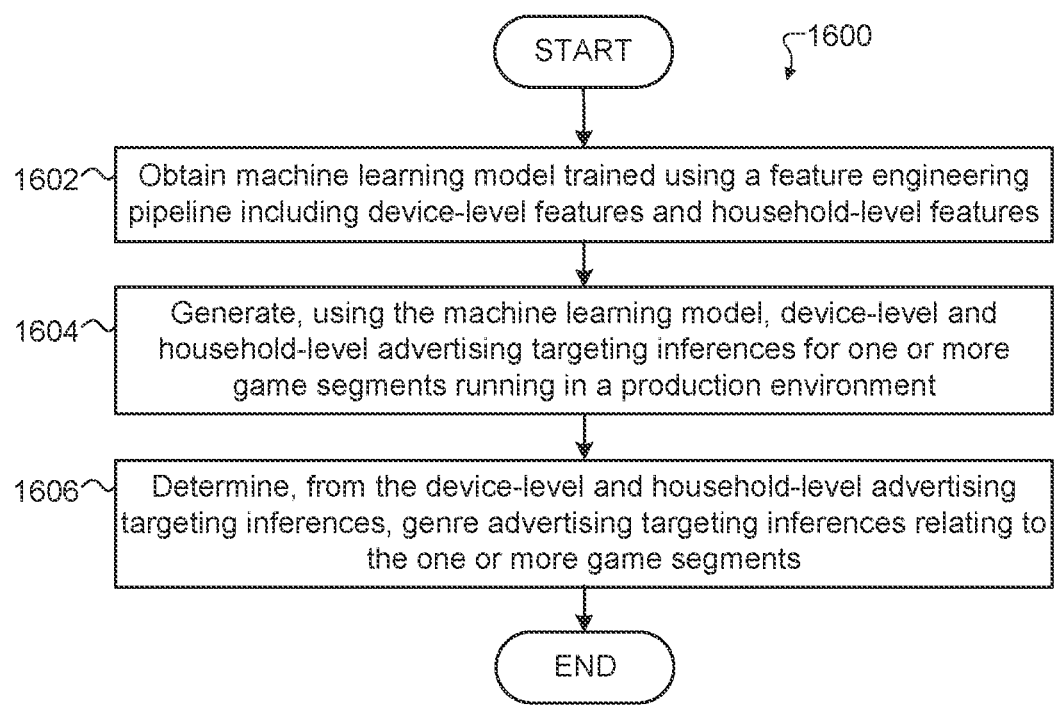
FIG. 16 illustrates an example method for using a trained machine learning model for multi-scale multi-granular targeting for game users in accordance with this disclosure.

FIG. 16 illustrates an example method 1600 for using a trained machine learning model for multi-scale multi-granular targeting for game users in accordance with this disclosure. For ease of explanation, the method 1600 is described with reference to the process flow 200 and the system 600. However, the method 1600 may be employed with any suitable process flow and system and may be readily modified to accommodate variations in the underlying process flow and/or system.

As shown in FIG. 16, a machine learning model (trained using a feature engineering pipeline including device-level features and household-level features) is obtained (step 1602). The machine learning model may have any suitable structure, such as the DNN models 226-227 in FIG. 2B. Using the machine learning model, device-level and household-level advertising targeting inferences for one or more game segments running in a production environment are generated (step 1604). This may be based on, for example, the final household segment 228 and the final device segment 229 in FIG. 2C. From the device-level and household-level advertising targeting inferences, genre advertising targeting inferences relating to the one or more game segments are determined (step 1606). This can be based on, for example, the final genre segment 231 in FIG. 2C.

Although FIG. 16 illustrates one example of a method 1600 for using a trained machine learning model, various changes may be made to FIG. 16. For example, while shown as a series of steps, various steps in FIG. 16 may overlap, occur in parallel, occur in a different order, or occur any number of times.

The techniques for multi-scale multi-granular targeting for game users described above may be used in various applications for various purposes. The following provides example use cases in which these techniques may be used. Note that these use cases are examples only, and the techniques for multi-scale multi-granular targeting for game users may be used in any other suitable manner.

In terms of advertising targeting, specific ad campaigns may be created to target individual users, since a good understanding of a user's gaming behavior is obtained. For cross-device advertising targeting, since the behavior of a user at a device-level can be determined, ads that are shown to the user on other devices that a user owns may be created. For example, if a user only plays games on a smart television using game consoles, gaming ads to target the same user on his or her mobile phone may be created.

In terms of lookalike modeling, once a seed segment from a machine learning model is created, that seed segment may be used to expand reach to many other users using distance metrics to calculate similarity scores between all users, where those users that are closest to the seed segment may be selected.

In terms of marketing analytics, feature vectors at the device- and household-level can be used to create gamer profiles. These feature vectors could have applications across many domains, especially in the marketing analytics domain since the feature vectors are an enriched representation of how users interact with different game titles and hardware. This information can aid in marketing certain products or ads to customers.

In terms of recommender systems, utilizing a sequence-based deep learning based approach, a recommender system may be designed to recommend game titles to each user based on that user's long-term or short-term preferences for the types of games preferred or (if available) the particular publisher preferred.

In terms of user clustering, feature vectors generated could be used to perform clustering of users to identify patterns of behavior among users. For example, if (after performing clustering) a cluster of users can be found that prefers gaming at night versus another cluster of users who have a preference for daytime gaming, gaming campaigns that are customized for each cluster may be designed differently.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
    obtaining, based on a sequential graph-based model, gaming exposure information over time, the gaming exposure information including device-level preferences and household-level preferences;
    combining one or more raw user behavior sessions into a gameplay session based on the obtained gaming exposure information;
    providing a scoring metric to (i) check an extent of multi-matching in the obtained gaming exposure information and (ii) remove untrustworthy gaming exposures from the obtained gaming exposure information; and
    generating, based on a feature engineering pipeline, one or more game segments running in a production environment, the one or more game segments identified for ancillary content based on inferences by a machine learning model trained using the gaming exposure information.

2. The method of claim 1, further comprising:
    stitching together one or more gaming exposures within a specified time window to approximate the gameplay session.

3. The method of claim 1, wherein obtaining the gaming exposure information over time comprises creating a graph representing a sequence of user interactions with game titles during a session based on game titles played and user interactions with devices on which the game titles were played.

4. The method of claim 1, wherein:
the household-level preferences are derived based on aggregation of device-level preferences for all devices in a household; and
device-level preferences for one or more smart televisions within the household are aggregated separately from device-level preferences for one or more mobile devices within the household.

5. The method of claim 1, wherein generating the one or more game segments running in the production environment comprises aggregating game metadata and time information corresponding to user behavior.

6. The method of claim 1, wherein providing the scoring metric comprises:
removing exposures having greater than a predefined overlap score as untrustworthy; and
determining an importance of a user's overlap score to prediction accuracy.

7. The method of claim 1, wherein combining the one or more raw user behavior sessions into the gameplay session comprises:
creating lists by user and game title of start times and end times for interactions of the user with the game titles; and
for each of the start times within a list that differs from a previous end time in the list by less than a specified amount, treating corresponding list items as a single game playing session.

8. An apparatus comprising:
at least one processing device configured to:
obtain, based on a sequential graph-based model, gaming exposure information over time, the gaming exposure information including device-level preferences and household-level preferences;
combine one or more raw user behavior sessions into a gameplay session based on the obtained gaming exposure information;
provide a scoring metric to (i) check an extent of multi-matching in the obtained gaming exposure information and (ii) remove untrustworthy gaming exposures from the obtained gaming exposure information; and
generate, based on a feature engineering pipeline, one or more game segments running in a production environment, the one or more game segments identified for ancillary content based on inferences by a machine learning model trained using the gaming exposure information.

9. The apparatus of claim 8, wherein the at least one processing device is further configured to stitch together one or more gaming exposures within a specified time window to approximate the gameplay session.

10. The apparatus of claim 8, wherein, to obtain the gaming exposure information over time, the at least one processing device is configured to create a graph representing a sequence of user interactions with game titles during a session based on game titles played and user interactions with devices on which the game titles were played.

11. The apparatus of claim 8, wherein:
the at least one processing device is configured to derive the household-level preferences based on aggregation of device-level preferences for all devices in a household; and
the at least one processing device is configured to aggregate device-level preferences for one or more smart televisions within the household separately from device-level preferences for one or more mobile devices within the household.

12. The apparatus of claim 8, wherein, to generate the one or more game segments running in the production environment, the at least one processing device is configured to aggregate game metadata and time information corresponding to user behavior.

13. The apparatus of claim 8, wherein, to provide the scoring metric, the at least one processing device is configured to:
remove exposures having greater than a predefined overlap score as untrustworthy; and
determine an importance of a user's overlap score to prediction accuracy.

14. The apparatus of claim 8, wherein, to combine the one or more raw user behavior sessions into the gameplay session, the at least one processing device is configured to:
create lists by user and game title of start times and end times for interactions of the user with the game titles; and
for each of the start times within a list that differs from a previous end time in the list by less than a specified amount, treat corresponding list items as a single game playing session.

15. A non-transitory computer readable medium containing instructions that when executed cause at least one processor to:
obtain, based on a sequential graph-based model, gaming exposure information over time, the gaming exposure information including device-level preferences and household-level preferences;
combine one or more raw user behavior sessions into a gameplay session based on the obtained gaming exposure information;
provide a scoring metric to (i) check an extent of multi-matching in the obtained gaming exposure information and (ii) remove untrustworthy gaming exposures from the obtained gaming exposure information; and
generate, based on a feature engineering pipeline, one or more game segments running in a production environment, the one or more game segments identified for ancillary content based on inferences by a machine learning model trained using the gaming exposure information.

16. The non-transitory computer readable medium of claim 15, further containing instructions that when executed cause the at least one processor to stitch together one or more gaming exposures within a specified time window to approximate the gameplay session.

17. The non-transitory computer readable medium of claim 15, wherein the instructions that when executed cause the at least one processor to obtain the gaming exposure information over time comprise:
instructions that when executed cause the at least one processor to create a graph representing a sequence of user interactions with game titles during a session based on game titles played and user interactions with devices on which the game titles were played.

18. The non-transitory computer readable medium of claim 15, wherein:
the instructions when executed cause the at least one processor to derive the household-level preferences based on aggregation of device-level preferences for all devices in a household; and
the instructions when executed cause the at least one processor to aggregate device-level preferences for one or more smart televisions within the household separately from device-level preferences for one or more mobile devices within the household.

19. The non-transitory computer readable medium of claim 15, wherein the instructions that when executed cause the at least one processor to generate the one or more game segments running in the production environment comprise:
instructions that when executed cause the at least one processor to aggregate game metadata and time information corresponding to user behavior.

20. The non-transitory computer readable medium of claim 15, wherein:
the instructions that when executed cause the at least one processor to provide the scoring metric comprise instructions that when executed cause the at least one processor to:
remove exposures having greater than a predefined overlap score as untrustworthy; and
determine an importance of a user's overlap score to prediction accuracy; and
the instructions that when executed cause the at least one processor to combine the one or more raw user behavior sessions into the gameplay session comprise instructions that when executed cause the at least one processor to:
create lists by user and game title of start times and end times for interactions of the user with the game titles; and
for each of the start times within a list that differs from a previous end time in the list by less than a specified amount, treat corresponding list items as a single game playing session.

21. A method comprising:
generating device-level advertising targeting inferences and household-level advertising targeting inferences for one or more game segments running in a production environment using inferencing by a machine learning model trained using a feature engineering pipeline to weight features according to gaming exposure information obtained over time, the gaming exposure information including at least device-level preferences and household-level preferences;
determining, based on an aggregation level specified by input data, that genre-level advertising targeting inferences are needed; and
from the device-level and household-level advertising targeting inferences, generating genre-level advertising targeting inferences relating to the one or more game segments using inferencing by the machine learning model.

22. The method of claim 21, wherein the machine learning model is trained based on a sequential graph-based model for the gaming exposure information over time including the device-level preferences and the household-level preferences.

23. The method of claim 21, wherein the machine learning model is trained based on data checked for multi-matching and with untrustworthy exposures removed.

24. The method of claim 21, wherein the machine learning model is trained based on data combining one or more raw user behavior sessions into a gameplay session.

25. The method of claim 21, wherein the machine learning model is trained based on stitching together one or more exposures within a specified time window to approximate a gameplay session.

* * * * *